(12) United States Patent  
Trovitch et al.

(10) Patent No.: US 11,273,432 B2  
(45) Date of Patent: Mar. 15, 2022

(54) BETA-DIKETIMINATE MANGANESE CATALYSTS FOR HYDROSILYLATION, HYDROBORATION, AND DEHYDROGENATIVE PNICTOGEN-SILICON AND PNICTOGEN-BORON BOND FORMATION

(71) Applicants: Ryan J. Trovitch, Phoenix, AZ (US); Thu Thao Nguyen, Tempe, AZ (US); Tufan K. Mukhopadhyay, Tempe, AZ (US); Brian M. Glazier, Tempe, AZ (US)

(72) Inventors: Ryan J. Trovitch, Phoenix, AZ (US); Thu Thao Nguyen, Tempe, AZ (US); Tufan K. Mukhopadhyay, Tempe, AZ (US); Brian M. Glazier, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 393 days.

(21) Appl. No.: 16/407,317

(22) Filed: May 9, 2019

(65) Prior Publication Data

US 2019/0366317 A1 Dec. 5, 2019

Related U.S. Application Data

(60) Provisional application No. 62/678,624, filed on May 31, 2018.

(51) Int. Cl.  
*B01J 31/18* (2006.01)  
*B01J 31/32* (2006.01)  
(Continued)

(52) U.S. Cl.  
CPC ........... *B01J 31/1815* (2013.01); *B01J 31/32* (2013.01); *C07B 47/00* (2013.01); *C08G 77/08* (2013.01);  
(Continued)

(58) Field of Classification Search  
None  
See application file for complete search history.

(56) References Cited

U.S. PATENT DOCUMENTS 3,159,601 A 12/1964 Ashby  
3,220,972 A 11/1965 Lamoreaux  
(Continued)

FOREIGN PATENT DOCUMENTS

WO WO 2001036427 5/2001  
WO WO 2013043874 3/2013  
(Continued)

OTHER PUBLICATIONS

Chai et al., "Structurally Characterized Neutral Monoalkyl and -aryl Complexes of Manganese(II)," Organometallics, 2004, 23:1177-1179.

(Continued)

*Primary Examiner* — Yun Qian  
(74) *Attorney, Agent, or Firm* — Fish & Richardson P.C.

(57) ABSTRACT

The synthesis and structure of beta-diketiminate manganese compounds are described, as well as their use as catalysts for the hydrosilylation and hydroboration of unsaturated organic compounds and main group element-main group element bond formation via dehydrogenative coupling.

6 Claims, 11 Drawing Sheets

(51) Int. Cl.
  *C08G 77/08* (2006.01)
  *C07B 47/00* (2006.01)
(52) U.S. Cl.
  CPC .. *B01J 2231/323* (2013.01); *B01J 2531/0216* (2013.01); *B01J 2531/72* (2013.01)

(56) References Cited

U.S. PATENT DOCUMENTS

| | | | |
|---|---|---|---|
| 3,775,452 | A | 11/1973 | Karstedt |
| 5,294,425 | A | 3/1994 | Schwab |
| 5,874,368 | A | 2/1999 | Laxman et al. |
| 6,329,487 | B1 | 12/2001 | Abel et al. |
| 7,915,533 | B2 | 3/2011 | Kaga et al. |
| 9,564,309 | B2 | 2/2017 | Niskanen et al. |
| 9,708,355 | B2 | 7/2017 | Trovitch et al. |
| 10,407,451 | B2 | 9/2019 | Trovitch et al. |
| 2008/0305648 | A1 | 12/2008 | Fukazawa et al. |
| 2011/0009565 | A1 | 1/2011 | Delis et al. |
| 2011/0009573 | A1 | 1/2011 | Delis et al. |
| 2012/0130021 | A1 | 5/2012 | Tondreau et al. |
| 2012/0130106 | A1 | 5/2012 | Chirik et al. |
| 2018/0230171 | A1 | 8/2018 | Sanchez et al. |

FOREIGN PATENT DOCUMENTS

| | | |
|---|---|---|
| WO | WO 2014201082 | 12/2014 |
| WO | WO 2018164709 | 9/2018 |

OTHER PUBLICATIONS

Chai et al., "Synthesis and Reaction of [{HC(CMeNAr)2}Mn]2 (Ar=2,6-iPr2C6H3): The Complex Containing Three-Coordinate Manganese(I) with a Mn—Mn Bond Exhibiting Unusual Magnetic Properties and Electronic Structure," J. Am. Chem. Soc., 2005, 127(25):9201-9206.
Chai et al., "Synthesis and Reaction of MnII Iodides Bearing the β-Diketiminate Ligand: the First Divalent Manganese N-Heterocyclic Carbene Complexes [{HC(CMeNAr)2}MnI{C[N(iPr)CMe]2}] and [{HC(CMeNAr)2}MnNHAr{C[N(iPr)CMe]2}] (Ar 2,6-iPr2C6H3)," Eur. J. Inorg. Chem., 2003, 4332-4337.
Chai et al., "Synthesis and Structure of Allyl and Alkynyl Complexes of Manganese(II) Supported by a Bulky β-Diketiminate Ligand," Organometallics, 2004, 23:5003-5006.
Chai et al., "Synthesis, Structure, and Reactivity of β-Diketiminate Complexes of Manganese(II)," Organometallics, 2004, 23:3284-3289.
Chalk et al., "Homogeneous Catalysis. II. The Mechanism of the Hydrosilation of Olefins Catalyzed by Group VIII Metal Complexes," J. Am. Chem. Soc., Jan. 1965, 87:16-21.
Geri et al., "A Proton-Switchable Bifunctional Ruthenium Complex That Catalyzes Nitrile Hydroboration," J. Am. Chem. Soc., 2015, 137:12808-12814.
Ghosh et al., "A Pentacoordinate MN(II) Precatalyst That Exhibits Notable Aldehyde and Ketone Hydrosilylation Turnover Frequencies," Inorg. Chem. 2015, 54:10398-10406.
Hilal et al., "Hydrosilylation Reactions Catalysed by Decacarbonyldimanganese(0)," J. Mol. Catal., 1987, 39:1-11.
Hilal et al., "Poly(siloxane)-supported decacarbonyldimanganese(0) catalyst for terminal olefin hydrosilylation reactions: the effect of the support on the catalyst selectivity, activity and stability," J. Mol. Catal., 1999, 144:47-59.
Jondi et al., "Highly active and selective catalysts for olefin hydrosilylation reactions using metalloporphyrins intercalated in natural clays," React. Chem. Eng., 2016, 1:194-203.
Kaithal et al., "Ruthenium-Catalyzed Selective Hydroboration of Nitriles and Imines," J. Org. Chem., 2016, 81:11153-11161.
Mudhopadhyay et al., "A β-diketiminate manganese catalyst for alkene hydrosilyation: substrate scope, silicone preparation, and mechanistic insight," Chem. Sci., 2018, 9:7673-7680.

Mukhopadhyay et al., "A Highly Active Manganese Precatalyst for the Hydrosilylation of Ketones and Esters," J. Am. Chem. Soc., 2014, 136:882-885.
Mukhopadhyay et al., "A β-diketiminate catalyst for alkene hydrosilylation: substrate scope, silicone preparation, and mechanistic insight," Chem. Sci., 2018, 9:7673-7680.
Mukhopadhyay et al., "Hydrosilylation of Aldehydes and Formates Using a Dimeric Manganese Precatalyst," Organometallics, 2017, 36:3477-3483.
Mukhopadhyay et al., "Mechanistic Investigation of Bis(imino)pyridine Manganese Catalyzed Carbonyl and Carboxylate Hydrosilylation," J. Am. Chem. Soc., 2017, 139:4901-4915.
Panda et al., "Synthesis and Characterization of Three-Coordinate and Related β-Diketiminate Derivatives of Manganese, Iron, and Cobalt," Inorg. Chem., 2002, 41:3909-16.
Pratt et al., "Hydrosilation Catalysis via Silylmanganese Carbonyl Complexes: Thermal vs. Photochemical Activation," J. Organomet. Chem., 1983, 258:C5-C8.
Price et al., "Manganese Silylene Hydride Complexes: Synthesis and Reactivity with Ethylene to Afford Silene Hydride Complexes," Agnew. Chem. Int. Ed., 2017, 56:6223-6227.
Prust et al., "Synthesis and Structures of Vinamidine $MN^{II}$, $Zn^{II}$, and $Cd^{II}$ Iodine Derivatives," Eur. J. Inorg. Chem., 2001, 6:1613-1616.
Roesky et al., "β-Diketiminate-Supported Manganese and Zinc Complexes," Inorg. Synth. 2010, 35:34-38.
Speier et al., "The Addition of Silicon Hydrides to Olefinic Double Bonds. Part II. The Use of Group VIII Metal Catalysts," J. Am. Chem. Soc., 1957, 79:974-979.
Stalzer et al., "Synthesis, Charaterization, and Thermal Properties of N-alkyl β-Diketiminate Manganese Complexes," Inorg. Chem., 2018, 57:3017-3024.
Troegel et al., "Recent advances and actual challenges in late transition metal catalyzed hydrosilylation of olefins from an industrial point of view," Coord. Chem. Rev., 2011, 255:1440-1459.
Webster, "β-Diketiminate complexes of the first row transition metals: applications in catalysis," Dalton Trans., 2017, 46:4483-4498.
Yang et al., "Dichotomy of Manganese Catalysis via Organometallic or Radical Mechanism: Stereodivergent Hydrosilylation of Alkynes," Agnew. Chem. Int. Ed., 2018, 57:923-928.
Yao et al., "Facile Metalation of Silicon and Germanium Analogues of Thiocarboxylic Acids with a Manganese(II) Hydride Precursor," Chem. Eur. J., 2012, 18:11356-11361.
Yempally et al., "Intramolecular C—C Bond Coupling of Nitriles to a Diimine Ligand in Group 7 Metal Tricarbonyl Complexes," Inorg. Chem., 2015, 54:11441-11449.
Allen et al., "Stoichiometric and Catalytic Si—N Bond Formation Using the p-Block Base Al(NMe2)3," Dalton Trans., 2015, 44:12112-12118.
Anderson et al., "Isopropyldisilylamine and Disilyl-t-Butylamine: Preparation, Spectroscopic Properties, and Molecular Structure in the Gas Phase, Determined by Electron Diffraction," J. Chem. Soc., Dalton Trans., 1989, 779-783.
Aylett et al., "The Preparation and Properties of Dimethylamino- and Diethylaminosilane," J. Chem. Soc. A, 1967, 652-655.
Barroso et al., "Polysilazane-Based Coatings with Anti-Adherent Properties for Easy Release of Plastics and Composites from Metal Molds," Adv. Mater. Interfaces, 2020, 7:1901952, 14 pages.
Bauer et al., "Preparation of Moisture Curable Polysilazane Coatings: Part I. Elucidation of Low Temperature Curing Kinetics by FT-IR Spectroscopy," Prog. Org. Coat., 2005, 53:183-190.
Bellini et al., "Alkaline-Earth-Catalysed Cross-Dehydrocoupling of Amines and Hydrosilanes: Reactivity Trends, Scope and Mechanism," Chem. Eur. J., 2016, 22:4564-4583.
Bellini et al., "Sequential Barium-Catalysed N—H/H—Si Dehydrogenative Cross-Couplings: Cyclodisilazanes versus Linear Oligosilazanes," Chem. Eur. J., 2016, 22:15733-15743.
Bellini et al., "Tailored Cyclic and Linear Polycarbosilazanes by Barium-Catalyzed N—H/H—Si Dehydrocoupling Reactions," Angew. Chem. Int. Ed., 2016, 55:3744-3748.
De Brito Mota, "Structural Properties of Amorphous Silicon Nitride," Phys. Rev. B, Oct. 1, 1998, 58(13):8323-8328.

(56) References Cited

OTHER PUBLICATIONS

Dunne et al., "Tris(Oxazolinyl)Boratomagnesium-Catalyzed Cross-Dehydrocoupling of Organosilanes with Amines, Hydrazine, and Ammonia," J. Am. Chem. Soc., 2011, 133:16782-16785.
El amrani et al., "Silicon Nitride Film for Solar Cells," Renewable Energy, 2008, 33:2289-2293.
Gasperini et al., "Seeking Heteroatom-Rich Compounds: Synthetic and Mechanistic Studies into Iron Catalyzed Dehydrocoupling of Silanes," ACS Catal., 2020, 10:6102-6112.
Gumpher et al., "Characterization of Low-Temperature Silicon Nitride LPCVD from Bis(tertiary-butylamino)silane and Ammonia," J. Electrochem. Soc., 2004, 151:G353-G359.
Hill et al., "Hetero-Dehydrocoupling of Silanes and Amines by Heavier Alkaline Earth Catalysis," Chem. Sci., 2013, 4:4212-4222.
Iwamoto et al., "$Si_3N_4$—TiN—$Y_2O_3$ Ceramics Derived from Chemically Modified Perhydropolysilazane," J. Mater. Res., Nov. 1999, 14(11):4294-4301.
Je et al., "Solution-Processable LaZrOx/$SiQ_2$ Gate Dielectric at LowTemperature of 180° C. for High-Performance Metal Oxide Field-Effect Transistors," ACS Appl. Mater. Interfaces, 2014, 6:18693-18703.
Kaloyeros et al., "Review—Silicon Nitride and Silicon Nitride-Rich Thin Film Technologies: State-of-the-Art Processing Technologies, Properties, and Applications," ECS J. Solid State Sci. Technol., Aug. 7, 2020, 9:063006, 54 pages.
Kang et al., "Proton Conducting Perhydropolysilazane-Derived Gate Dielectric for Solution-Processed Metal Oxide-Based Thin-Film Transistors," ACS Appl. Mater. Interfaces, 2020, 12:15396-15405.
Khomenkova et al., "Optical, Structural and Electrical Characterizations of Stacked Hf-Based and Silicon Nitride Dielectrics," Thin Solid Films, 2016, 617:143-149.
Kim, Kwan-Ho, "Fabrication and Properties of Silicon-Nitride Films Deposited by Using PECVD with a Tris(Dimethylamino)Silane of Aminosilane Precursor," J. Korean Phys. Soc., Dec. 2015, 67(12):2115-2119.
Kuo, Y., "Plasma Enhanced Chemical Vapor Deposited Silicon Nitride as a Gate Dielectric Film for Amorphous Silicon Thin Film Transistors—a Critical Review," Vacuum, 1998, 51(4):741-745.
Levy et al., "Low Pressure Chemical Vapor Deposition of Silicon Nitride Using the Environmentally Friendly Tris(Dimethylamino)Silane Precursor," J. Mater. Res., Jun. 1996, 11(6):1483-1488.
Lewis et al., "Magnetic Resonance Characterization of Solid-state Intermediates in the Generation of Ceramics by Pyrolysis of Hydridopolysilazane," J. Mater. Sci., 1995, 30:5020-5030.
Li et al., "A Dialkyl Calcium Carbene Adduct: Synthesis, Structure, and Catalytic Cross-Dehydrocoupling of Silanes with Amines," Eur. J. Inorg. Chem., 2019, 2231-2235.

Morris et al., "Ferrocene-Containing Polycarbosilazanes via the Alkaline-Earth-Catalyzed Dehydrocoupling of Silanes and Amines," Organometallics, 2019, 38:3629-3648.
Mukhopadhyay et al., "A β-Diketiminate Manganese Catalyst for Alkene Hydrosilylation: Substrate Scope, Silicone Preparation, and Mechanistic Insight," Chem. Sci., 2018, 9:7673-7680.
Nguyen et al., "Scope and Mechanism of Nitrile Hydroboration Mediated by a β-Diketiminate Manganese Hydride Catalyst," Chem. Commun., 2020, 56:3959-3962.
Nguyen et al., "Sustainable Synthesis of CVD Precursors and Polysilazanes through Manganese Catalyzed Dehydrocoupling," Nature Synthesis, 2021, 20 pages.
Oh et al., "The Electronic Structure of a β-Diketiminate Manganese Hydride Dimer," Dalton Trans., 2020, 49:14463-14474.
Philipp, H. R., "Optical Properties of Silicon Nitride," J. Electrochem. Soc., Feb. 1973, 120:295-300.
Pindwal et al., "Homoleptic Divalent Dialkyl Lanthanide-Catalyzed Cross-Dehydrocoupling of Silanes and Amines," Organometallics, 2016, 35:1674-1683.
Reuter et al., "Silicon-Nitrogen Bond Formation via Heterodehydrocoupling and Catalytic N-Silylation," Chem. Eur. J., 2021 27:3251-3261.
Ríos et al., "Selective Catalytic Synthesis of Amino-Silanes at Part-per Million Catalyst Loadings," Chem. Commun., 2018, 54:619-622.
Roenigk et al., "Low-Pressure CVD of Silicon Nitride," J.Electrochem. Soc., Jul. 1987, 134(7):1777-1785.
Schwab et al., "The Pyrolytic Conversion of Perhydropolysilazane into Silicon Nitride," Ceram. Int., 1998, 24:411-414.
Seyferth et al., "A Liquid Silazane Precursor to Silicon Nitride," J. Am. Ceram. Soc., Jan. 1983, 66, C-13-C-14.
Smith, A. L., "Infrared Spectra-Structure Correlations for Organosilicon Compounds," Spectrochimica Acta, 1960, 16:87-105.
Van Assche et al., "On the Intrinsic Moisture Permeation Rate of Remote Microwave Plasma-Deposited Silicon Nitride Layers," Thin Solid Films, 2014, 558:54-61.
Wang et al., "The Conversion of Perhydropolysilazane into SiON Films Characterized by X-Ray Photoelectron Spectroscopy," J. Am. Ceram. Soc., Dec. 2012, 95(12):3722-3725.
Witanowski et al., "Nitrogen NMR Spectroscopy," In Annual Reports on NMR Spectroscopy; Webb, G. A., Ed.; Academic Press, 1978, 7:117-244.
Yonekura et al., "Zinc-Catalyzed Dehydrogenative Silylation of Indoles," Organometallics, 2017, 36:3234-3249.
Yusup et al., "Reactivity of Different Surface Sites with Silicon Chlorides during Atomic Layer Deposition of Silicon Nitride," RSC Adv., 2016, 6:68515-68524.
Zhang et al., "Hydrophobic, Transparent and Hard Silicon Oxynitride Coating from Perhydropolysilazane," Polym. Int., 2015, 64:971-978.

BETA-DIKETIMINATE MANGANESE CATALYSTS FOR HYDROSILYLATION, HYDROBORATION, AND DEHYDROGENATIVE PNICTOGEN-SILICON AND PNICTOGEN-BORON BOND FORMATION

CROSS-REFERENCE TO RELATED APPLICATION

This application claims the benefit of U.S. Application No. 62/678,624 filed on May 31, 2018, which is incorporated by reference herein in its entirety.

STATEMENT OF GOVERNMENT INTEREST

This invention was made with government support under 1651686 awarded by the National Science Foundation. The government has certain rights in the invention.

TECHNICAL FIELD

This invention relates to the preparation of beta-diketiminate manganese compounds and their use as catalysts for the hydrosilylation and hydroboration of unsaturated organic compounds, as well as main group element-main group element bond formation via dehydrogenative coupling.

BACKGROUND

Transition metal catalysts are widely used by the chemical industry to prepare value-added small molecules and polymers. In many circumstances, the leading catalyst for a given transformation features a precious metal center (Ru, Os, Rh, Ir, Pd, or Pt). Precious metals are expensive due to their low abundance on Earth. Moreover, precious metals exhibit toxicity and small residual concentrations of these metals in a final product or material can be harmful to the end user.

SUMMARY

The use of non-toxic manganese catalysts averts the need for multiple purification steps at the end of product synthesis, lowering the overall cost of production. Additionally, the use of manganese catalysts can allow for the preparation of chemical reagents for the electronic materials industry and can add value to medical products such as silicone-based tubing and implants. Applications of particular relevance include the use of beta-diketiminate manganese complexes to catalyze olefin hydrosilylation, olefin hydroboration, nitrile dihydroboration, dehydrogenative amine silylation, dehydrogenative amine borylation, and the reliance on these transformations to prepare oligomers or polymers. Such compounds can more broadly be used for dehydrogenative main group element-main group element bond formation reactions.

In a first general aspect, a beta-diketiminate manganese complex has one of the following structures:

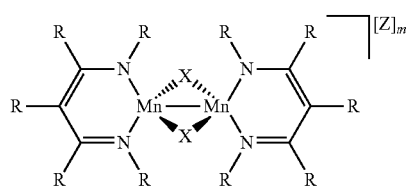

G-1.1

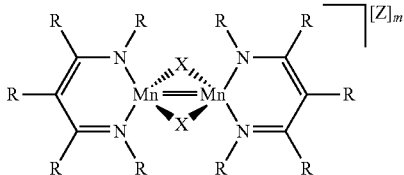

G-1.2

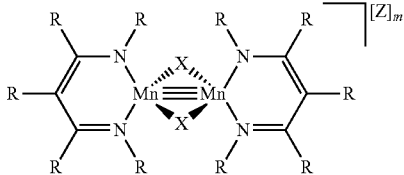

G-1.3

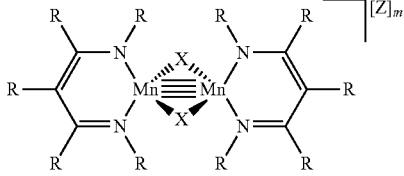

G-1.4

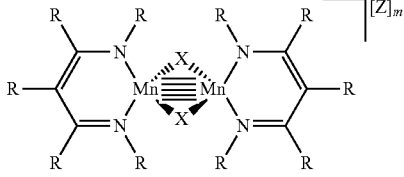

G-1.5 where:
each X independently represents a hydride, an alkyl, an alkoxide, an amide, a silyl, or a boryl;
each R independently represents hydrogen; a substituted, unsubstituted, or cyclic $C_1$-$C_{24}$ alkyl group that optionally comprises one or more heteroatoms; an aryl or substituted aryl group that optionally comprises one or more heteroatoms; a ring formed from two R groups taken together that is a substituted or unsubstituted, saturated or unsaturated cyclic structure that optionally comprises one or more heteroatoms; a halide; an alkoxide; an amide; a silyl; a boryl; or any combination or salt thereof;
Z represents halide, nitrate, sulfate, perchlorate, $BF_4$, $BPh_4$ or substituted $BPh_4$, $PF_6$, triflate, or azide; and
m is an integer of 0 to 6.

In a second general aspect, facilitating a hydrosilylation reaction includes reacting a compound having an Si—H bond with an unsaturated organic compound having a carbon-carbon double bond in the presence of one or more of the manganese complexes of the first general aspect.

In some implementations of the second general aspect, the Si and H atoms in the Si—H bond can added across the carbon-carbon double bond of the unsaturated organic compound to yield an organosilicon compound or silicone.

In a third general aspect, facilitating a hydroboration reaction includes reacting a compound having a B—H bond with an unsaturated organic compound having a carbon-carbon double bond in the presence of one or more of the manganese complexes of the first general aspect.

In some implementations of the third general aspect, the B and H atoms in the B—H bond are added across the carbon-carbon double bond of the unsaturated organic compound.

In a fourth general aspect, facilitating a dehydrogenative amine silylation reaction includes reacting a first compound having one or more Si—H bonds with a second compound having one or more N—H bonds in the presence of one or more of the manganese complexes of the first general aspect.

Implementations of the fourth general aspect may include one or more of the following features.

$H_2$ can be formed from hydrogen in at least one of the one or more Si—H bonds of the first compound and hydrogen in at least one of the one or more the N—H bonds of the second compound to yield a product having one or more Si—N bonds. In some cases, the first compound includes $SiH_4$ and the second compound includes $NH_3$, and $H_2$ is formed from one or more hydrogens in the $SiH_4$ and one or more hydrogens in the $NH_3$ to yield a polysilazane polymer having one or more Si—N bonds. The polysilazane polymer can have one or more Si—H bonds, one or more N—H bonds, or both. In some cases, the first compound includes a siloxane polymer and the second compound includes a monomer or a polymer having one or more amine groups, and $H_2$ is formed from the first compound and the second compound to yield a polysilazane polymer having one or more Si—N bonds. The polysilazane polymer can include one or more Si—H bonds, one or more N—H bonds, or both.

In a fifth general aspect, facilitating a dehydrogenative amine borylation reaction includes reacting a first compound having one or more B—H bonds with a second compound having one or more N—H bonds in the presence of one or more of the manganese complexes of the first general aspect.

Implementations of the fifth general aspect may include one or more of the following features.

In some cases, $H_2$ is formed from a hydrogen in one of the B—H bonds of the first compound and a hydrogen in one of the N—H bonds of the second compound to yield a product having one or more B—N bonds. In certain cases, the first compound includes $BH_3$ and the second compound includes $NH_3$, and $H_2$ is formed from one or more hydrogens in one or more of the B—H bonds of $BH_3$ and one or more hydrogens in one or more of the N—H bonds of $NH_3$ to yield an amorphous boron nitride polymer having one or more B—N bonds. The amorphous boron nitride polymer can have one or more B—H bonds, one or more N—H bonds, or both. In some cases, the first compound includes $BH_3$ and the second compound includes a monomer or polymer having one or more amine groups, and $H_2$ is formed from one or more hydrogens in one or more of the B—H bonds of $BH_3$ and one or more hydrogens in one or more of the N—H bonds in the second compound to yield a boron nitride polymer having one or more B—N bonds. The boron nitride polymer can have one or more B—H bonds, one or more N—H bonds, or both.

In a sixth general aspect, facilitating a dehydrogenative main group element-main group element bond-forming reaction includes reacting a first compound having an E-H bond with a second compound having an E'—H bond in the presence of one or more of the manganese complexes of the first general aspect, wherein each of E and E' independently represents $BR_n$, $AlR_n$, $GaR_n$, $InR_n$, $TlR_n$, $CR_n$, $SiR_n$, $GeR_n$, $SnR_n$, $PbR_n$, $NR_n$, $PR_n$, $AsR_n$, $SbR_n$, or $BiR_n$, where R represents hydride, alkyl, aryl, alkoxide, aryloxide, E, OE, SE, SeE, TeE, or halide, and n is an integer, valency permitting.

Implementations of the sixth general aspect may include one or more of the following features. In some cases, $H_2$ is formed from the E-H bond of the first compound and the E'—H bond of the second compound to yield a monomeric, oligomeric, or polymeric product having one or more E-E' bonds. The polymeric product can have one or more E-H bonds, one or more E'—H bonds, or both.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1:
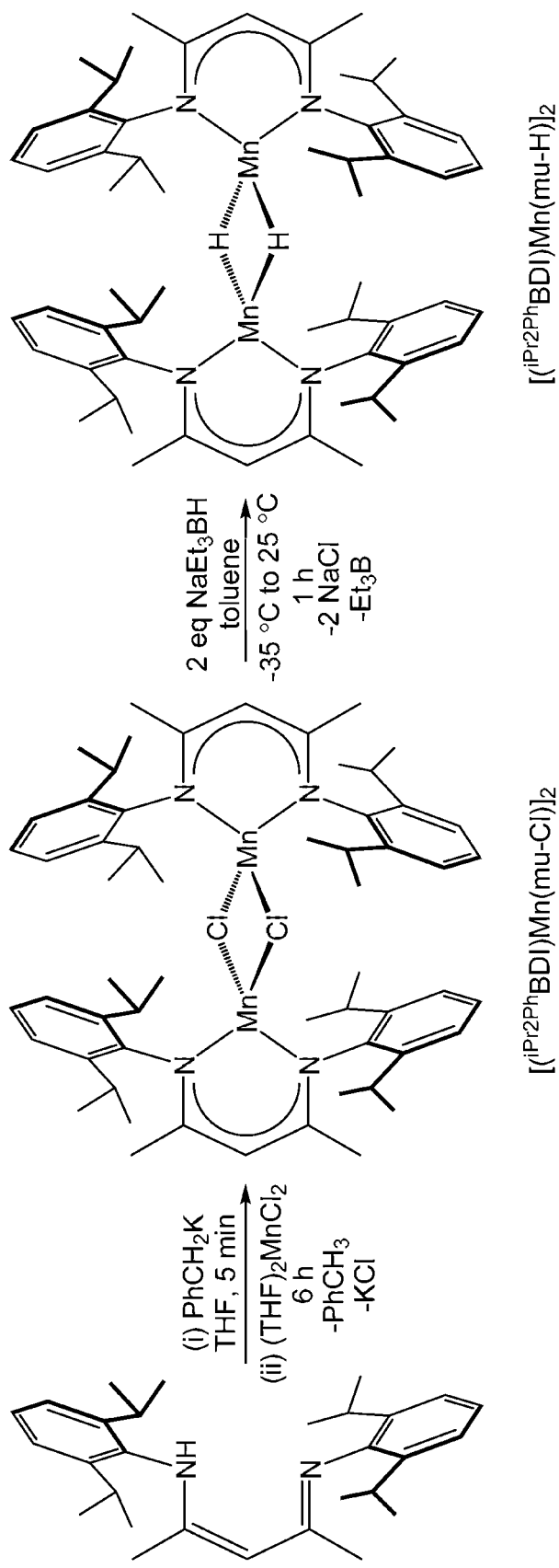
FIG. 1 depicts synthesis of bis[N,N'-(1,3-dimethyl-1,3-propanediylidene)bis[2,6-bis(1-methylethyl)benzenamin-ato-κN]dimanganese-di-μ-hydride, $[(^{iPr2Ph}BDI)Mn(\mu-H)]_2$.

The synthesis of beta-diketiminate (BDI) Mn dimers and their use as catalysts for hydrosilylation, hydroboration, and dehydrogenative main group element-main group element bond formation are described.

Examples of (BDI) Mn complexes are shown by General Formulas G-1-G-13.

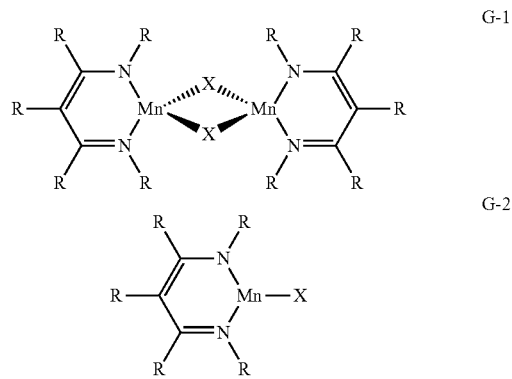

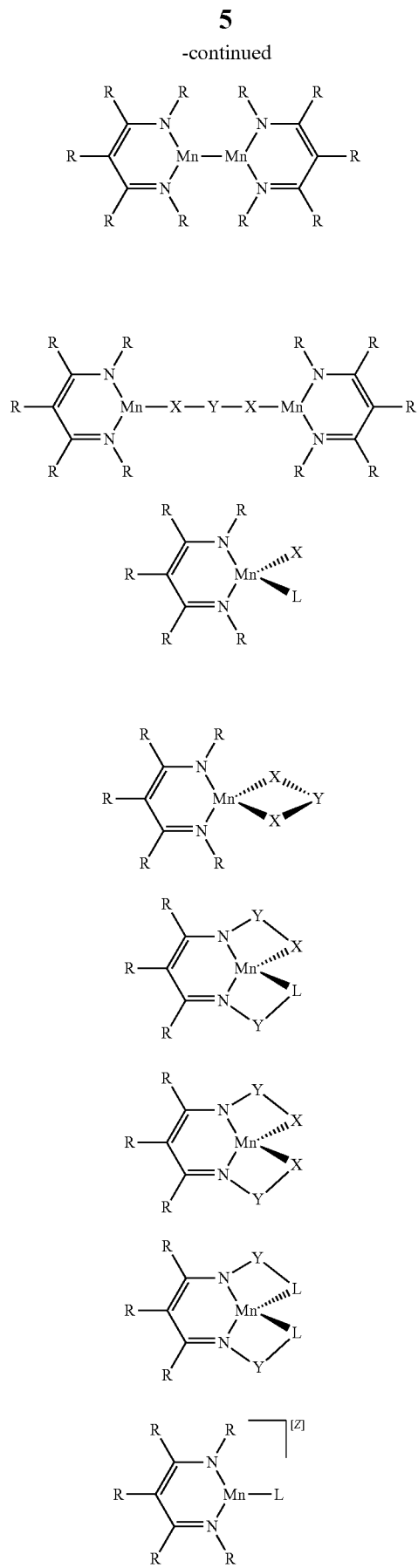
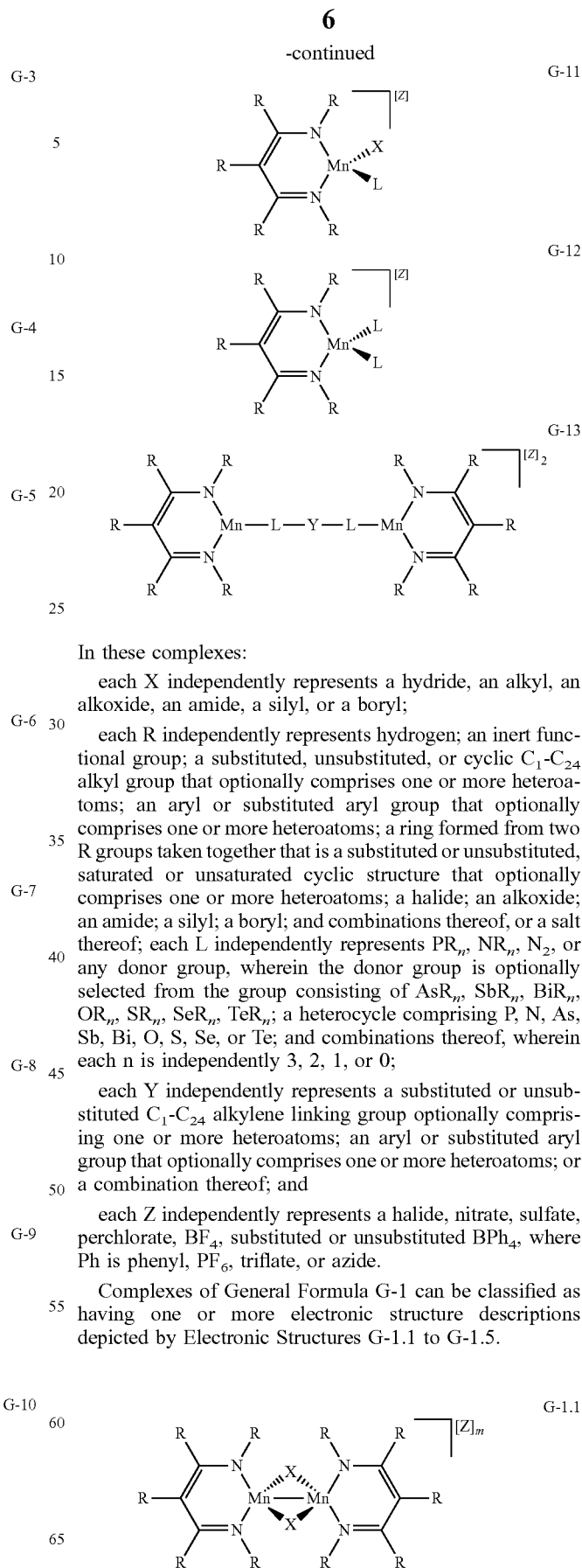

In these complexes:

each X independently represents a hydride, an alkyl, an alkoxide, an amide, a silyl, or a boryl;

each R independently represents hydrogen; an inert functional group; a substituted, unsubstituted, or cyclic $C_1$-$C_{24}$ alkyl group that optionally comprises one or more heteroatoms; an aryl or substituted aryl group that optionally comprises one or more heteroatoms; a ring formed from two R groups taken together that is a substituted or unsubstituted, saturated or unsaturated cyclic structure that optionally comprises one or more heteroatoms; a halide; an alkoxide; an amide; a silyl; a boryl; and combinations thereof, or a salt thereof; each L independently represents $PR_n$, $NR_n$, $N_2$, or any donor group, wherein the donor group is optionally selected from the group consisting of $AsR_n$, $SbR_n$, $BiR_n$, $OR_n$, $SR_n$, $SeR_n$, $TeR_n$; a heterocycle comprising P, N, As, Sb, Bi, O, S, Se, or Te; and combinations thereof, wherein each n is independently 3, 2, 1, or 0;

each Y independently represents a substituted or unsubstituted $C_1$-$C_{24}$ alkylene linking group optionally comprising one or more heteroatoms; an aryl or substituted aryl group that optionally comprises one or more heteroatoms; or a combination thereof; and each Z independently represents a halide, nitrate, sulfate, perchlorate, $BF_4$, substituted or unsubstituted $BPh_4$, where Ph is phenyl, $PF_6$, triflate, or azide.

Complexes of General Formula G-1 can be classified as having one or more electronic structure descriptions depicted by Electronic Structures G-1.1 to G-1.5.

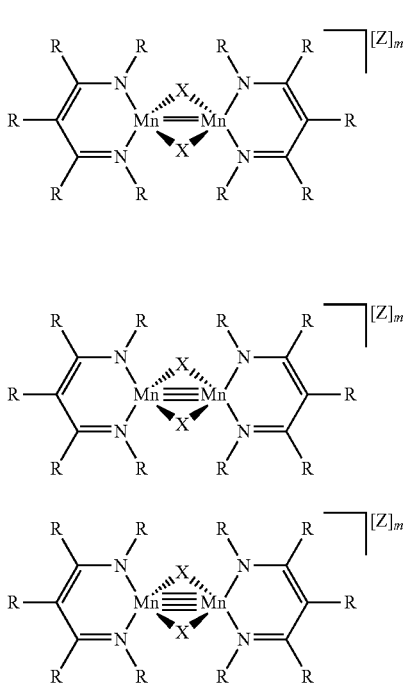

G-1.2

G-1.3

G-1.4

G-1.5

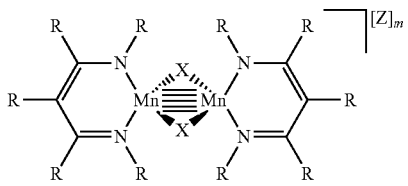

G-1.1.0

G-1.2.0

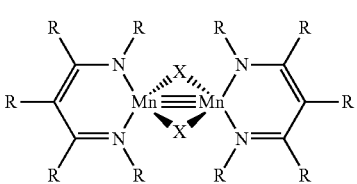

G-1.3.0

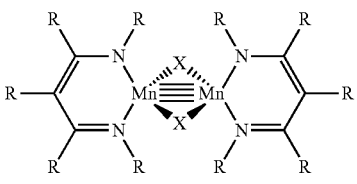

G-1.4.0

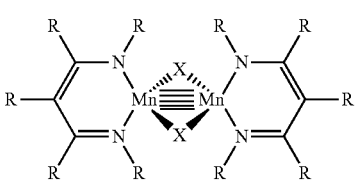

G-1.5.0

In Electronic Structures G-1.1 to G-1.5, variables R, X, and Z are as previously defined, and m is an integer of 0 to 6. When m is 0, the manganese dimer is neutral. When m is 1 to 6, the manganese dimer is cationic, and m is chosen such that the manganese dimer and the anion (Z) form a neutral salt. Electronic Structures G-1.1 to G-1.5 have an electron count about each manganese center increasing by 1 from 14 (G-1.1) to 18 (G-1.5) as a function of Mn—Mn bond order (1 to 5).

When m=0, Electronic Structures G-1.1 to G-1.5 are depicted as Electronic Structures G-1.1.0 to G-1.5.0, respectively.

One example of General Formula G-1 is shown below as Formula g-1.

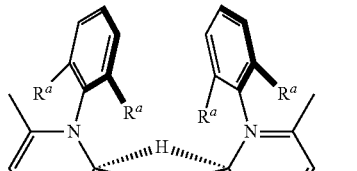

Formula g-1

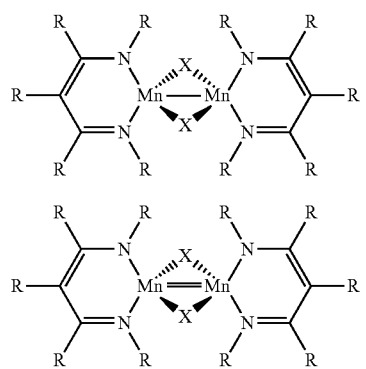

In Formula g-1, each nitrogen is substituted with a phenyl substituent, where each $R^a$ independently represents an alkyl group having at least three carbon atoms. In some examples, each $R^a$ independently represents $^iPr$, $^tBu$, or $^nBu$.

Formula g-1 can also be considered to have a distribution of electronic structures including Formula g-1.2, g-1.3, and g-1.4.

Formula g-1.2

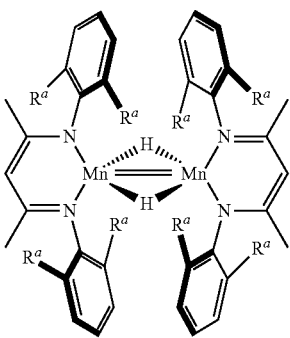

Formula g-1.3

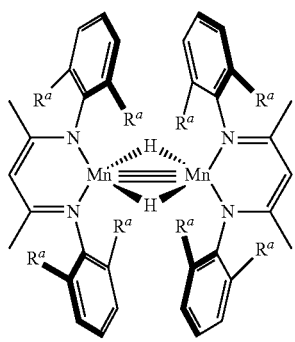

Structure g-1.2a

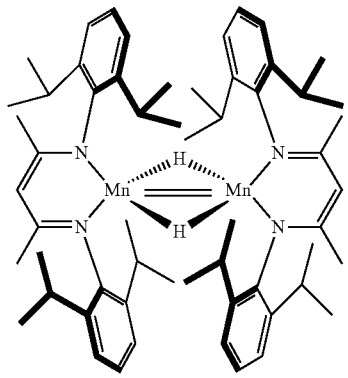

Structure g-1.3a

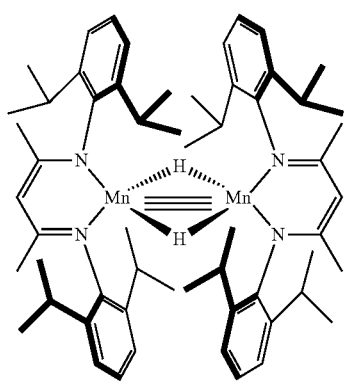

Formula g-1.4

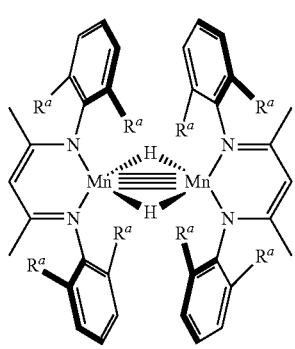

Structure g-1.4a

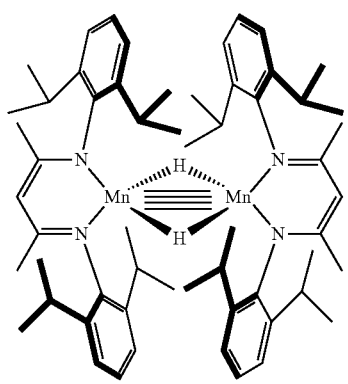

Structure g-1a

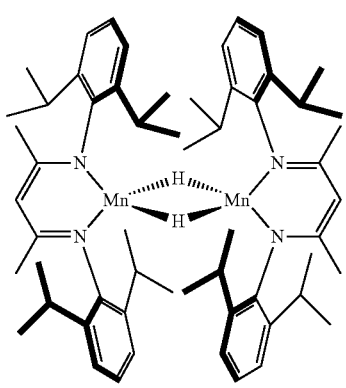

Structure g-1a is an example of Formula g-1, in which each $R^a$ is isopropyl.

Structure g-1a can be considered to have a distribution of electronic structures including Structure g-1.2a, Structure g-1.3a, and Structure g-1.4a.

This assignment can be made by analyzing the relevant electron paramagnetic resonance data, as described in *Chem. Sci.* 2018, 9, 7673-7680, which is incorporated herein by reference.

Manganese complexes with analogous electronic structures described herein can be used to catalyze hydrosilylation reactions. In one example, a compound having an Si—H bond is reacted with an unsaturated organic compound in the presence of one or more of the complexes of Electronic Structures G-1.1-G-1.5. The Si and H atoms in the Si—H bond are typically added across the alkene functionality of the unsaturated compound to form an organosilicon compound or silicone.

Manganese complexes described herein can be used to catalyze hydroboration reactions. In one example, a compound having a B—H bond is reacted with an unsaturated organic compound in the presence of one or more of the complexes of Electronic Structures G-1.1-G-1.5. The B and H atoms in the B—H bond are typically added across an alkene or nitrile functionality of an unsaturated organic compound to reduce the unsaturated bond.

Manganese complexes described herein can also be used to catalyze dehydrogenative main group element-main group element bond formation reactions. In one example, a compound having an Si—H bond is reacted with a compound having an N—H bond in the presence of one or more of the complexes of Electronic Structures G-1.1-G-1.5. The H atoms of the Si—H and N—H bonds are typically eliminated as $H_2$ and Si—N bond formation ensues.

Manganese complexes described herein can be used to catalyze hydrosilylation reactions. In one example, a compound having an Si—H bond is reacted with an unsaturated organic compound in the presence of one or more of the complexes of General Formulas G-1 to G-13. The Si and H atoms in the Si—H bond are typically added across the alkene functionality of the unsaturated organic compound to form an organosilicon compound or silicone.

Manganese complexes described herein can be used to catalyze hydroboration reactions. In one example, a compound having a B—H bond is reacted with an unsaturated organic compound in the presence of one or more of the manganese complexes of General Formulas G-1 to G-13. The B and H atoms in the B—H bond are typically added across the alkene functionality of an unsaturated organic compound to reduce the unsaturated bond.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to be limiting in scope. Some of these synthetic examples have been performed. Others are based on an understanding of related synthetic procedures and are predictive in nature. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Various synthetic procedures described herein are recited in the examples. These methods are provided to illustrate various methods of preparation, but are not intended to limit any of the methods recited herein. Accordingly, one of skill in the art in possession of this disclosure could readily modify a recited method or utilize a different method to prepare one or more of the compounds described herein. The following aspects are only exemplary and are not intended to be limiting in scope. Temperatures, catalysts, concentrations, reactant compositions, and other reaction conditions can vary, and one of skill in the art, in possession of this disclosure, could readily select appropriate reactants and conditions for a desired complex.

Example A

FIG. 1 depicts synthesis of bis[N,N-(1,3-dimethyl-1,3-propanediylidene)bis[2,6-bis(1-methylethyl)benzenaminato-κN]dimanganese-di-μ-hydride, [($^{iPr2Ph}$BDI)Mn(μ-H)]$_2$. Dimeric [($^{iPr2Ph}$BDI)Mn(μ-Cl)]$_2$ was synthesized, and deprotonation of $^{iPr2Ph}$BDIH was achieved using benzyl potassium. The resulting [K][$^{iPr2Ph}$BDI] salt without further isolation was treated with (THF)$_2$MnCl$_2$ for 6 h, which afforded [($^{iPr2Ph}$BDI)Mn(μ-Cl)]$_2$ as a bright yellow powder following work up. The $^1$H NMR spectrum of [($^{iPr2Ph}$BDI)Mn(μ-Cl)]$_2$ shows paramagnetically broadened resonances. Reaction of [($^{iPr2Ph}$BDI)Mn(μ-Cl)]$_2$ with NaEt$_3$BH afforded a yellowish-green complex after 1 h, which was identified as dimeric [($^{iPr2Ph}$BDI)Mn(μ-H)]$_2$. Paramagnetically broadened resonances ranging over 25 ppm were observed in the $^1$H NMR spectrum of this complex. Evans method magnetic susceptibility measurement revealed a $\mu_{eff}$ of $5.2\mu_B$, suggesting four unpaired electrons in the dimer. Single crystals suitable for X-ray diffraction were obtained by cooling a concentrated toluene solution of the complex layered with pentane, which confirmed the bridging hydride arrangement in [($^{iPr2Ph}$BDI)Mn(μ-H)]$_2$.

Figure 2:
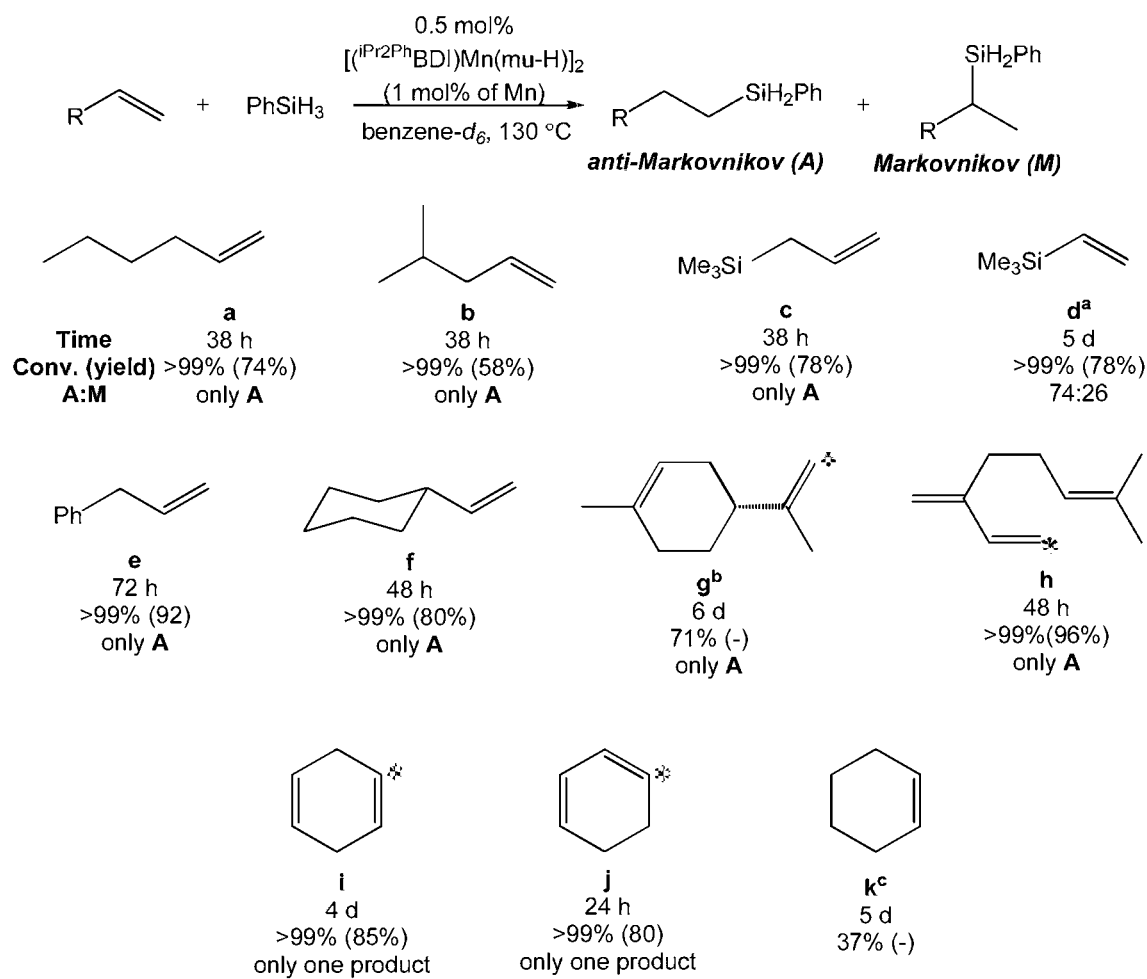
FIG. 2 depicts alkene hydrosilylation with anti-Markovnikov selectivity, catalyzed by $[(^{iPr2Ph}BDI)Mn(\mu-H)]_2$. The star (*) shows the position of silicon incorporation.

FIG. 2 depicts alkene hydrosilylation with anti-Markovnikov selectivity, catalyzed by 0.5 mol % of [($^{iPr2Ph}$BDI)Mn(μ-H)]$_2$ (1 mol % based on Mn). The star (*) shows the position of silicon incorporation. All reactions were carried out under $N_2$ atmosphere in a J. Young tube and the products were isolated. The reactivity of [($^{iPr2Ph}$BDI)Mn(μ-H)]$_2$ was investigated. An equimolar mixture of 1-hexene (a) and PhSiH$_3$ in presence of 0.5 mol % of [($^{iPr2Ph}$BDI)Mn(μ-H)]$_2$ (1 mol % based on Mn) in benzene-$d_6$ was heated to 130° C. for 38 h, which showed complete conversion of 1-hexene to the anti-Markovnikov (A) product n-C$_6$H$_{13}$SiH$_2$Ph. Conducting the same reaction with Ph$_2$SiH$_2$, Ph$_3$SiH, and (EtO)$_3$SiH showed no conversion. However, 61% conversion was obtained after 48 h when Et$_2$SiH$_2$ was used. Therefore, PhSiH$_3$ was used as the Si—H source for substrate screening.

Similarly, 10 additional alkene substrates were screened for hydrosilylation under identical conditions and the resulting silanes were isolated following work up under inert atmosphere. 4-Methyl-1-pentene (b) took 38 h to reach completion, furnishing the anti-Markovnikov product (A) in 58% yield. While the hydrosilylation of allyltrimethylsilane (c) was completed in 38 h resulting in A, vinyltrimethylsilane (d) required 5 d giving rise to a mixture of A and the Markovnikov product (M) with an A:M ratio of 74:26. Allylbenzene (e) and vinylcyclohexane (f) were completed in 72 h and 48 h respectively, affording A with decent yields. D-limonene (g) upon hydrosilylation displays 71% conversion after 6 d while producing A. The internal ring olefin moiety was untouched over the course of catalysis. The terminal olefin bond in myrcene (h) is selectively hydrosilylated over the internal olefin bonds after 48 h and A is the only product formed. One olefin bond of 1,4-cyclohexadiene (i) was hydrosilylated in 4 d to form cyclohex-3-en-1-yl (phenyl)silane. The conjugated regioisomer 1,3-cyclohexadiene (j) furnished the same cyclohex-3-en-1-yl(phenyl) silane in 24 h. Cyclohexene (k) afforded 37% conversion to phenylcyclohexylsilane after 5 d along with products of the dehydrogenative silylation of benzene-$d_6$. The silane products were not isolated. All of the fully hydrosilylated products were isolated with good yields and high purity, following filtration and thorough drying.

Figure 3:
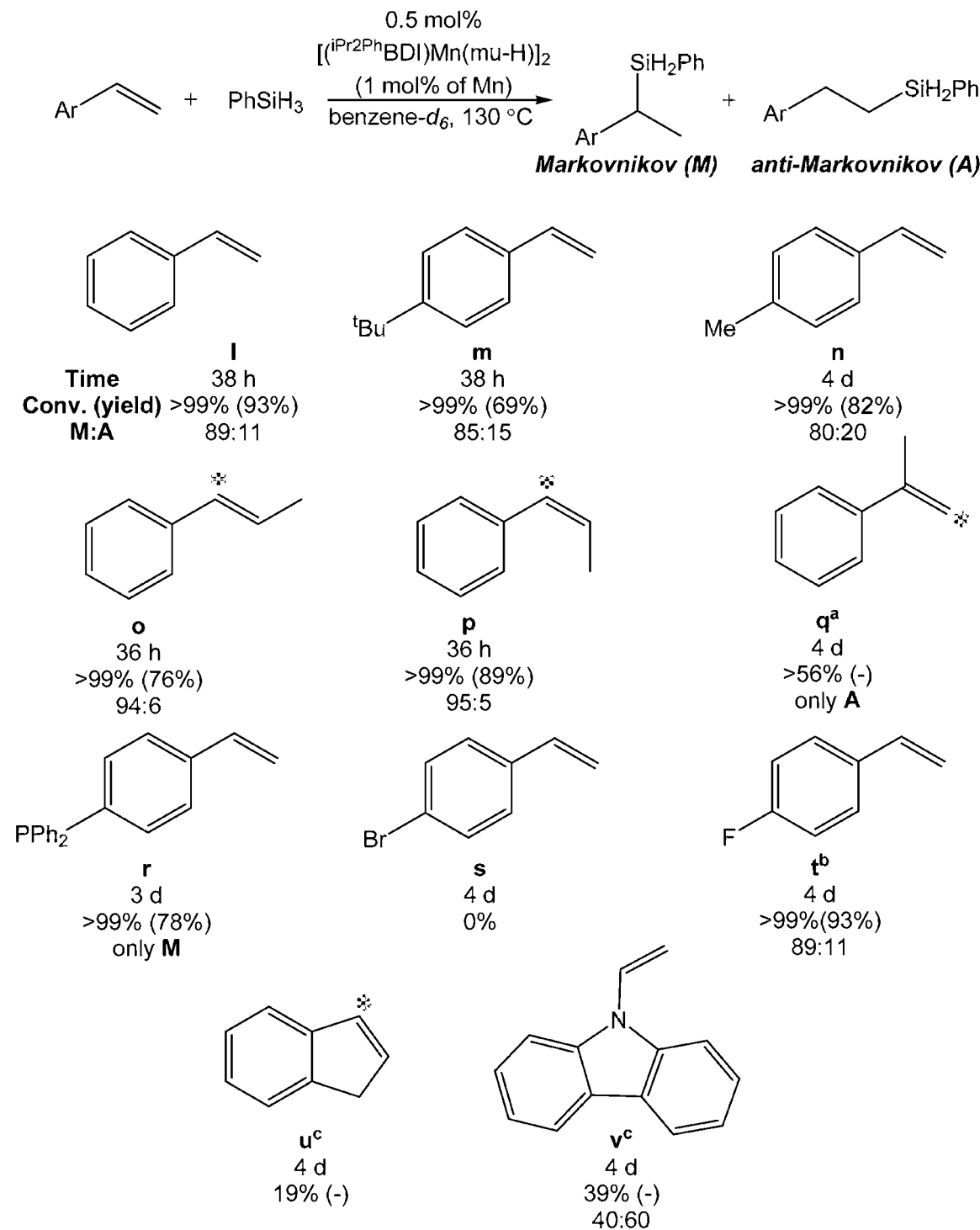
FIG. 3 depicts styrene hydrosilylation with Markovnikov selectivity catalyzed by $[(^{iPr2Ph}BDI)Mn(\mu-H)]_2$. The star (*) shows the position of silicon incorporation.

FIG. 3 depicts styrene hydrosilylation with Markovnikov selectivity catalyzed by 0.5 mol % of [($^{iPr2Ph}$BDI)Mn(μ-H)]$_2$ (1 mol % based on Mn). All reactions were carried out under $N_2$ atmosphere in a J. Young tube and the completely converted products were isolated. The star (*) shows the position of silicon incorporation. When styrenes were used as substrates, Markovnikov's product was observed either as the exclusive or major product under identical conditions. When styrene (1) was heated with one equivalent of PhSiH$_3$ and 0.5 mol % of [($^{iPr2Ph}$BDI)Mn(μ-H)]$_2$ (1 mol % based on Mn) in benzene-$d_6$, greater than 99% conversion was noticed in 38 h. Evaporation of the solvent and filtration with pentane allowed for the removal of insoluble [($^{iPr2Ph}$BDI)Mn(μ-H)]$_2$ and the filtrate upon drying under vacuum yielded a pale yellowish oil containing 89% of M and 11% of A silane product. An additional 11 substrates were screened under identical conditions and the corresponding silane products were isolated in decent yield and purity. While 4-tert-butylstyrene (m) took 38 h for completion resulting in a M:A ratio of 85:15, 4-methylstyrene (n) required 4 d to produce 80% M and 20% A silane. Trans-β-methylstyrene (o) and cis-P-methylstyrene (p) were successfully hydrosilylated in 36 h to form 95% of M and 5% of A. In contrast, a-methylstyrene (q) afforded only 56% conversion after 4 d to form A silane and no trace of M product was observed. No further conversion was noticed after heating the reaction for 10 d. The hydrosilylation trend observed for o and p further supports the Markovnikov selectivity observed for the hydrosilylation of styrenes. Notably, 4-diphenylphosphinostyrene (r) was completely hydrosilylated in 3 d giving only M product. While 4-bromostyrene (s) did not show any catalysis after 4 d, 4-fluorostyrene (t) was completely consumed in 4 d. However, the product mixture displayed a mixture of A and M silanes along with unidentified products caused by ring defluorination followed by silylation as indicated by multiple resonances in the $^{19}$F NMR spectrum. Hydrosilylation of indene (u) afforded 19% conversion after 4 d to the corresponding M silane product. Similarly, 9-vinylcarbazole (v) showed 39% conversion after 4 d and the product mixture was found to contain 40% M and 60% A silane product.

The effectiveness of [($^{iPr2Ph}$BDI)Mn(μ-H)]$_2$ in mediating hydrosilylation of vinyl-functionalized monomers with hydrosiloxanes to yield cross-linked silicone fluids was investigated. Heating a mixture of polymethylhydrosiloxane (PMHS) and vinyl terminated poly(dimethylsiloxane) with a stoichiometric amount of [($^{iPr2Ph}$BDI)Mn(μ-H)]$_2$ under neat conditions at 130° C. for 5 d, afforded a colorless gummy solid after catalyst deactivation and washing. Heating a neat mixture of PMHS and 1,2,4-trivinylcyclohexane (3:1) and 20 mol % 2 for 5 d followed by catalyst deactivation and washing with isopropanol yielded a colorless transparent gummy solid.

In order to rationalize the substrate dependent regioselectivity in [($^{iPr2Ph}$BDI)Mn(μ-H)]$_2$ catalyzed alkene hydrosilylation, investigation of the mechanism was sought.

Figure 4:
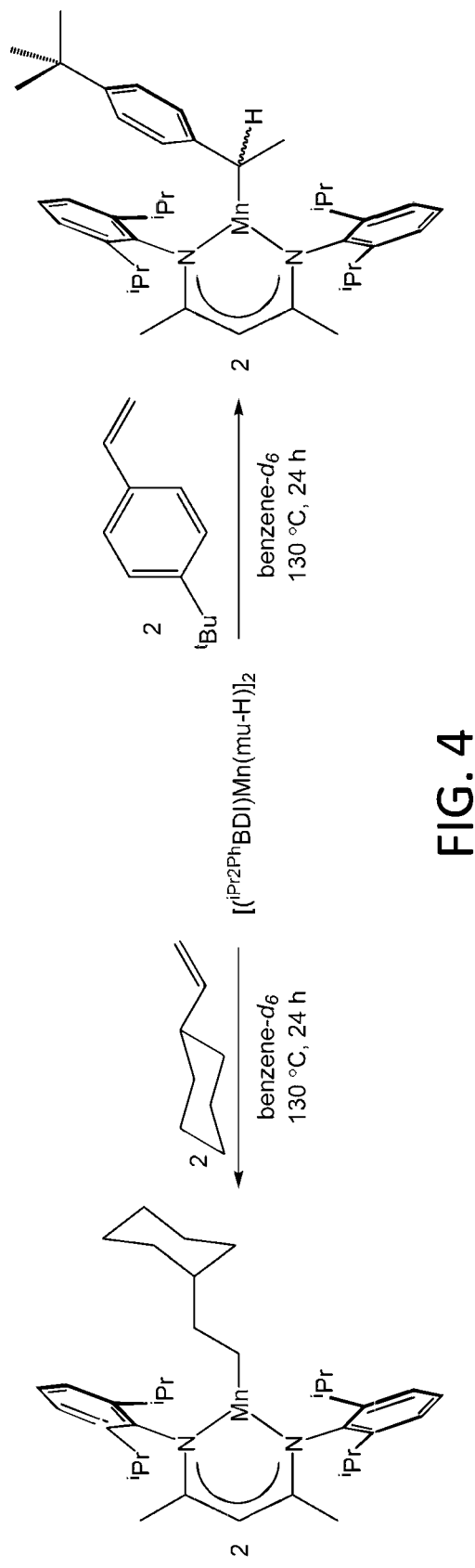
FIG. 4 depicts synthesis of intermediates $(^{iPr2Ph}BDI)Mn(CH_2CH_2Cy)$ (left) and $(^{iPr2Ph}BDI)Mn(CH(CH_3)(Ph-4-^tBu))$ (right).
Figure 5:
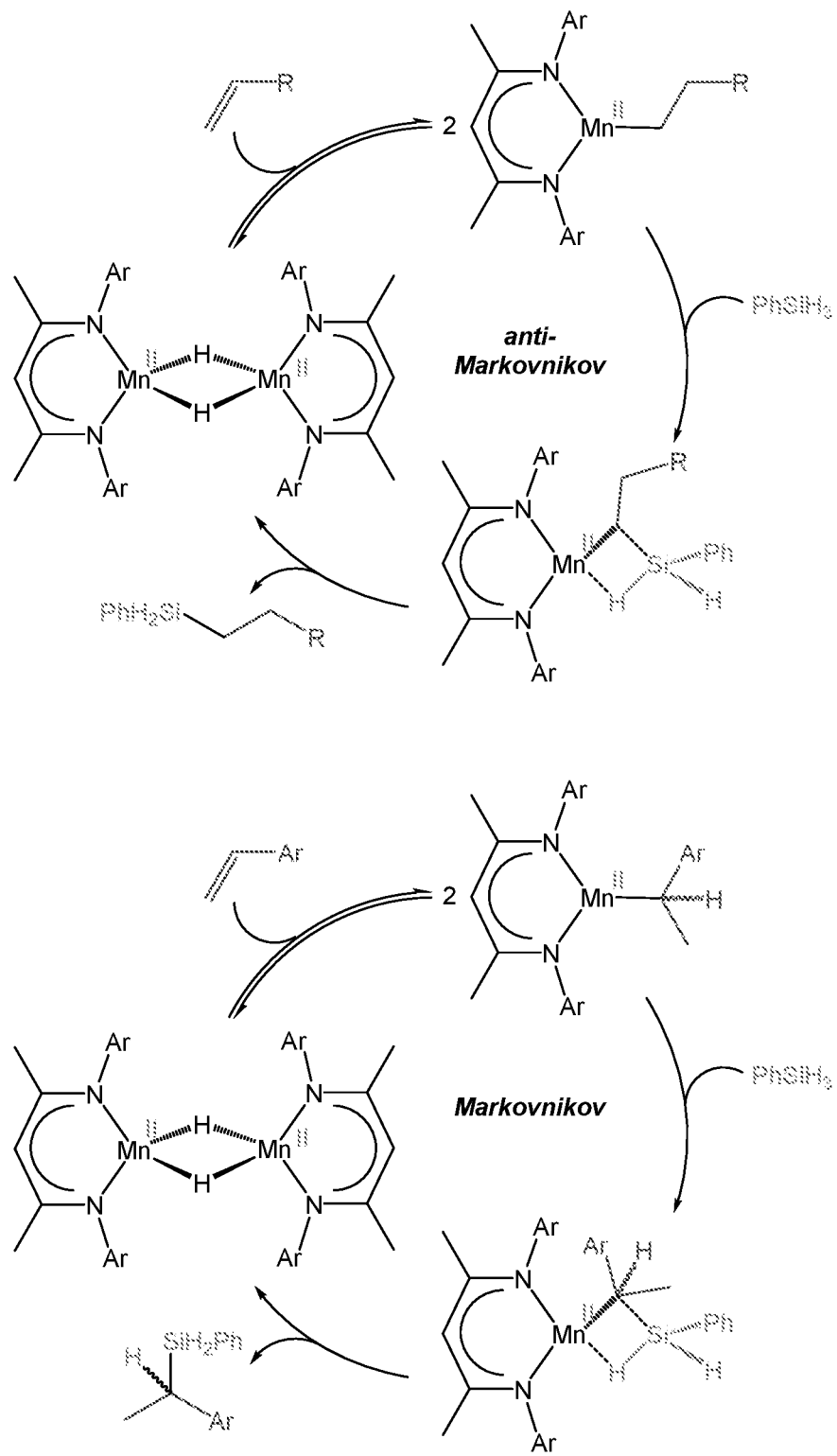
FIG. 5 depicts the proposed mechanism of alkene hydrosilylation.

FIG. 4 depicts synthesis of intermediates ($^{iPr2Ph}$BDI)Mn(CH$_2$CH$_2$Cy) (left) and ($^{iPr2Ph}$BDI)Mn(CH(CH$_3$)(Ph-4-$^t$Bu)) (right). FIG. 5 depicts the proposed mechanism of alkene hydrosilylation. The top figure shows the pathway responsible for anti-Markovnikov selectivity and the bottom figure shows the pathway responsible for Markovnikov selectivity. [($^{iPr2Ph}$BDI)Mn(μ-H)]$_2$ was heated with two equivalents (one equivalent per Mn) of PhSiH$_3$ at 130° C. for 24 h. Analysis of the reaction mixture by $^1$H NMR and $^{29}$Si NMR showed no Si—H oxidative addition and [($^{iPr2Ph}$BDI)Mn(μ-H)]$_2$ was recovered quantitatively after reaction. This observation suggests that the Si—H oxidative addition pathway is not the first step in this case. In contrast, heating a mixture of [($^{iPr2Ph}$BDI)Mn(μ-H)]$_2$ and two equiv. of vinylcyclohexane at 130° C. for 24 h allowed for the isolation of a new complex identified as ($^{iPr2Ph}$BDI)Mn(CH$_2$CH$_2$Cy), which exhibits a new set of paramagnetically broadened $^1$H NMR resonances. Similarly, heating [($^{iPr2Ph}$BDI)Mn(μ-H)]$_2$ and two equiv. of 4-tert-butylstyrene at 130° C. for 24 h yielded a new monomeric complex identified as ($^{iPr2Ph}$BDI)Mn(CH(CH$_3$)(Ph-4-$^t$Bu)) (FIG. 4). Cooling a concentrated Et$_2$O solution of ($^{iPr2Ph}$BDI)Mn(CH(CH$_3$)(Ph-4-$^t$Bu)) at −35° C. afforded yellow crystals suitable for X-ray diffraction. The solid-state structure of ($^{iPr2Ph}$BDI)Mn(CH(CH$_3$)(Ph-4-$^t$Bu)) revealed a stable branched alkyl ligand (FIG. 4), which rationalizes the alkene insertion path as the initiation step (FIG. 5). Moreover, formation of the branched alkyl complex after styrene insertion explains the Markovnikov selectivity observed during styrene hydrosilylation.

It is believed that heating [($^{iPr2Ph}$BDI)Mn(μ-H)]$_2$ allows for dissociation to generate monomeric ($^{iPr2Ph}$BDI)MnH, which forms an alkyl intermediate following alkene insertion into the Mn—H bond. In presence of PhSiH$_3$, this alkyl intermediate undergoes C-bond metathesis to form the silane product and ($^{iPr2Ph}$BDI)MnH. Monomeric ($^{iPr2Ph}$BDI)MnH is believed to dimerize after catalysis takes place since [($^{iPr2Ph}$BDI)Mn(μ-H)]$_2$ is recovered after each reaction. Notably, the nature of Markovnikov selectivity for styrene hydrosilylation is clearly demonstrated by isolation of alkyl complex ($^{iPr2Ph}$BDI)Mn(CH(CH$_3$)(Ph-4-$^t$Bu)), following insertion at the benzylic carbon of 4-tert-butylstyrene.

Examples 1-3

Exemplary Preparation Methods for Manganese Complexes

Example 1: Synthesis of bis[N, N-(1,3-dimethyl-1,3-propanediylidene)bis[2,6-bis(1-methylethyl)benzenaminato-κN]dimanganese-di-μ-hydride (Hereafter [($^{iPr2Ph}$BDI)Mn(μ-H)]$_2$)

A 20 mL vial was charged with [($^{iPr2Ph}$BDI)Mn(μ-Cl)]$_2$ (0.501 g, 0.986 mmol) in 10 mL toluene and cooled at −35° C. A solution of NaEt$_3$BH (1.23 mL, 1.232 mmol) in 5 mL toluene was also cooled at −35° C. After 30 min of cooling, the NaEt$_3$BH solution was slowly added to the toluene slurry of [($^{iPr2Ph}$BDI)Mn(μ-Cl)]$_2$ while stirring. A color change from yellow to dark brown was noticed along with disappearance of the yellow solids. After stirring at room temperature for 1 h, the dark brown solution was filtered through Celite. The filtrate was concentrated, layered with pentane and upon cooling at −35° C. overnight, yellowish-green crystals of [($^{iPr2Ph}$BDI)Mn(μ-H)]$_2$ (0.308 g, 0.650 mmol, 66%) were obtained. Magnetic susceptibility (Evans method, 25° C.) μ$_{eff}$=5.17μ$_B$ (considering dimeric structure in solution). $^1$H NMR (benzene-d, 25° C., ppm): 20.10, 11.56, 5.45, −4.18. [($^{iPr2Ph}$BDI)Mn(μ-H)]$_2$ is illustrated below:

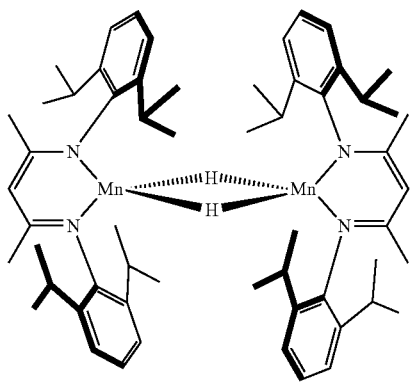

Accounting for resonance, [($^{iPr2Ph}$BDI)Mn(μ-H)]$_2$ can also be drawn as:

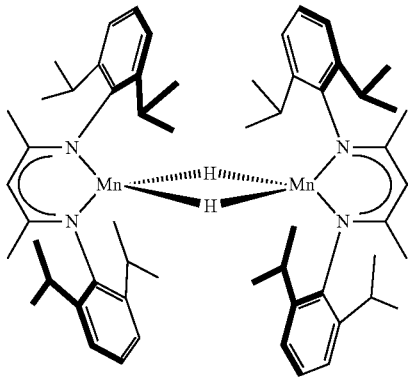

Accounting for resonance, [($^{iPr2Ph}$BDI)Mn(t-O$^t$Bu)]$_2$ can also be drawn as:

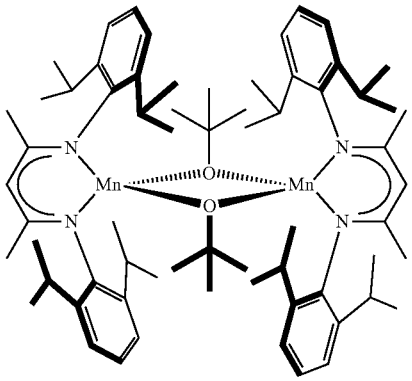

Example 2: Synthesis of bis[N,N'-(1,3-dimethyl-1,3-propanediylidene)bis[2,6-bis(1-methylethyl)benzenaminato-κN]dimanganese-di-t-tert-butoxide (Hereafter [($^{iPr2Ph}$BDI)Mn(μ-O$^t$Bu)]$_2$)

A 20 mL scintillation vial was charged with [($^{iPr2Ph}$BDI)Mn(μ-Cl)]$_2$ (0.318 g, 0.313 mmol) in 5 mL dry THF. A 10 mL THF solution of NaO$^t$Bu (0.065 g, 0.627 mmol) was added to it and stirred at room temperature. Immediate consumption of the insoluble [($^{iPr2Ph}$BDI)MnCl]$_2$ was observed to form a homogeneous solution with a white precipitate (NaCl). After 2 h, the suspension was filtered through Celite and the clear filtrate was dried under vacuum to obtain an orange solid film. It was washed with pentane (2×1 mL) and dried to isolate an orange powder identified as [($^{iPr2Ph}$BDI)Mn(μ-O$^t$Bu)]$_2$ (0.211 g, 62%). Cooling a concentrated Et$_2$O solution of this compound at −35° C. for 12 h afforded crystals suitable for X-ray diffraction. $^1$H NMR (benzene-d$_6$, 25° C., ppm): 17.26 (broad), 3.37 (broad), 1.16 (tert-butyl). [($^{iPr2Ph}$BDI)Mn(μ-O$^t$Bu)]$_2$ is illustrated below:

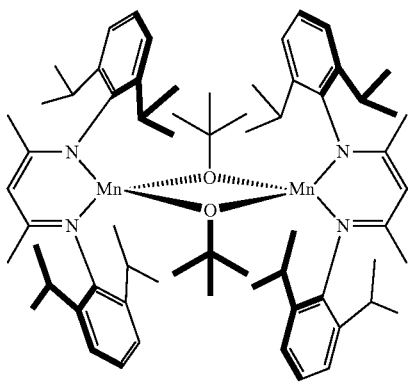

Example 3: Synthesis of [N,N'-(1,3-dimethyl-1,3-propanediylidene)bis[2,6-bis(1-methylethyl)benzenaminato-κV]manganese(1-(4-tert-butylphenyl)ethyl) [Hereafter ($^{iPr2Ph}$BDI)Mn(CH(CH$_3$)(4-$^t$BuPh))]

A Schlenk bomb was charged with [($^{iPr2Ph}$BDI)Mn(μ-H)]$_2$ (0.065 g, 0.0686 mmol) in 5 mL toluene. Two equivalents of 4-tert-butylstyrene (25 μL, 0.138 mmol) were added to it. The bomb was capped under N$_2$ atmosphere and heated at 130° C. for 16 h, during which time a brownish-yellow solution formed. The bomb was cooled to room temperature and brought under N$_2$. The solution was then filtered through Celite and dried under vacuum. The residue was dissolved in 1 mL pentane. Upon cooling at −35° C. for 48 h, the pentane solution afforded yellow crystals (0.022 g, yield=50%) which were identified as ($^{iPr2Ph}$BDI)Mn(CH(CH$_3$)(4-$^t$BuPh)). $^1$H NMR (benzene-d, 25° C., ppm): 24.51 (br), 12.08 (br), 7.26 (br), 2.50 (br), 1.26 (br), −1.78 (br). ($^{iPr2Ph}$BDI)Mn(CH(CH$_3$)(4-$^t$BuPh) is illustrated below:

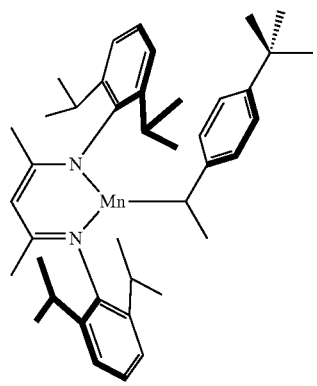

Accounting for resonance, $(^{iPr2Ph}BDI)Mn(CH(CH_3)(4^{-t}BuPh))$ can also be drawn as:

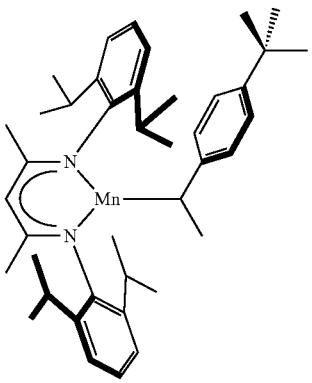

Examples 4-21

Alkene Hydrosilylation Reactions Employing the Disclosed Metal Complexes Example 4: Hydrosilylation of 1-hexene catalyzed by 0.5 mol % of $[(^{iPr2Ph}BDI)Mn(\mu-H)]_2$ (1 mol % based on Mn).

In the glove box, PhSiH$_3$ (78.2 μL, 0.633 mmol) and 1-hexene (79.1 μL, 0.633 mmol) were added to a J. Young tube containing a benzene-d$_6$ solution of $[(^{iPr2Ph}BDI)Mn(\mu-H)]_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 38 h of heating, >99% conversion was observed. The tube was then brought back into the glove box and the solution was dried under vacuum. The residue was filtered with pentane (3 mL) through Celite to separate the insoluble catalyst from the silane product. The pentane solution was then dried under vacuum to isolate an oil identified as PhSiH$_2$(CH$_2$)$_5$CH$_3$ (0.0898 g, 74%). $^1$H NMR (benzene-d$_6$, 25° C., ppm): 7.56-7.47 (m, 2H, phenyl), 7.20-7.12 (m, 3H, phenyl), 4.51 (m, 2H, SiH$_2$Ph), 1.39 (m, 2H, CH$_2$), 1.24 (m, 6H, CH$_2$), 0.86 (m, 3H, CH$_3$), 0.81 (m, 2H, CH$_2$). $^{13}$C NMR (benzene-d$_6$, 25° C., ppm): 135.58 (phenyl), 132.91 (phenyl), 129.84 (phenyl), 128.35 (phenyl), 32.93 (CH$_2$), 31.84 (CH$_2$), 25.45 (CH$_2$), 22.96 (CH$_2$), 14.35 (CH$_2$), 10.40 (CH$_3$). $^{29}$Si NMR (benzene-d$_6$, 25° C., ppm): −31.05 (SiH$_2$Ph).

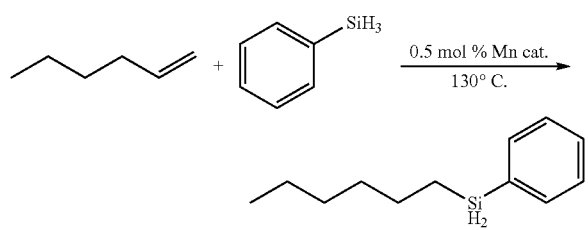

Example 5: Hydrosilylation of 4-methyl-1-pentene catalyzed by 0.5 mol % of $[(^{iPr2Ph}BDI)Mn(\mu-H)]_2$ (1 mol % based on Mn)

In the glove box, PhSiH$_3$ (78.2 μL, 0.633 mmol) and 4-methyl-1-pentene (80.7 μL, 0.633 mmol) were added to a J. Young tube containing a benzene-d$_6$ solution of $[(^{iPr2Ph}BDI)Mn(\mu-H)]_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 38 h of heating, greater than 99% conversion was observed. The tube was then brought back into the glove box and the solution was dried under vacuum. The residue was filtered with pentane (3 mL) through Celite to separate the insoluble catalyst from the silane product. The pentane solution was then dried under vacuum to isolate an oil identified as PhSiH$_2$(CH$_2$)$_3$CH(CH$_3$)$_2$ (0.071 g, 58%). $^1$H NMR (benzene-d$_6$, 25° C., ppm): 7.52 (m, 2H, phenyl), 7.17 (m, 3H, phenyl), 4.51 (m, 2H, SiH$_2$Ph), 1.41 (m, 3H, CH$_2$ and CH), 1.18 (m, 2H, CH$_2$), 0.82 (d, J=6.6, 6H, CH$_3$), 0.79 (m, 2H, CH$_2$). $^{13}$C NMR (benzene-d$_6$, 25° C., ppm): 135.58 (phenyl), 132.89 (phenyl), 129.85 (phenyl), 128.35 (phenyl), 42.54 (CH$_2$), 27.97 (CH), 23.26 (CH$_2$), 22.73 (CH$_3$), 10.53 (CH$_2$). $^{29}$Si NMR (benzene-d$_6$, 25° C., ppm): −30.99 (SiH$_2$Ph).

Example 6: Hydrosilylation of vinyltrimethylsilane catalyzed by 0.5 mol % of $[(^{iPr2Ph}BDI)Mn(\mu-H)]_2$ (1 mol % based on Mn)

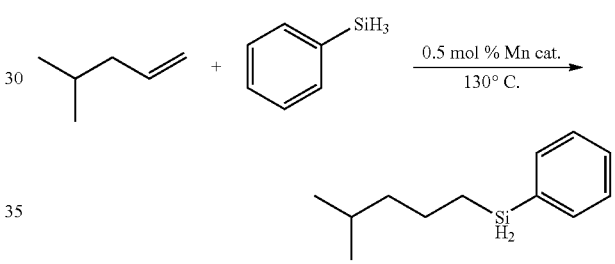

In the glove box, PhSiH$_3$ (78.2 μL, 0.633 mmol) and vinyltrimethylsilane (92.8 μL, 0.633 mmol) were added to a J. Young tube containing a benzene-d$_6$ solution of $[(^{iPr2Ph}BDI)Mn(\mu-H)]_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 5 d of heating, >99% conversion was observed, which showed the formation of the anti-Markovnikov's product PhSiH$_2$(CH$_2$)$_2$SiMe$_3$ (74%) along with 26% of Markovnikov's product, PhSiH$_2$CH(CH$_3$)(SiMe$_3$). The tube was then brought back into the glove box and the solution was dried under vacuum. The residue was filtered with pentane (3 mL) through Celite to separate the insoluble catalyst from the generated silane. The pentane was then removed under vacuum to isolate an oil identified as PhSiH$_2$(CH$_2$)$_2$Si(CH$_3$)$_3$ (0.104 g, 78%). The isolated mixture consists of 74% of PhSiH$_2$(CH$_2$)$_2$SiMe$_3$ and 26% of PhSiH$_2$CH(CH$_3$)(SiMe$_3$). PhSiH$_2$(CH$_2$)$_2$SiMe$_3$: $^1$H NMR (benzene-d$_6$, 25° C., ppm): 7.52 (broad m, 2H, phenyl), 7.17 (broad m, 3H, phenyl), 4.52 (broad, SiH$_2$Ph), 0.74 (broad m, 2H, CH$_2$), 0.53 (broad m, 2H, CH$_2$), −0.07 (s, 9H, SiMe$_3$). $^{13}$C NMR (benzene-d$_6$, 25° C., ppm): 135.60 (phenyl), 133.00 (phenyl), 129.88 (phenyl), 128.37 (phenyl), 10.84 (CH$_2$), 3.10 (CH$_2$), 2.09 (SiMe$_3$). $^{29}$Si NMR (benzene-d$_6$, 25° C., ppm): −26.90 (SiH$_2$Ph), 2.56 (SiMe$_3$). PhSiH$_2$CH(CH$_3$)(SiMe$_3$): $^1$H NMR (benzene-d$_6$, 25° C., ppm): aromatic and SiH$_2$Ph resonances are overlapped with the major product, 1.05 (d, CH$_3$), 0.11 (broad m, CH), 0.01 (s, SiMe$_3$). $^{13}$C NMR (benzene-d$_6$, 25° C., ppm): 135.80 (phenyl), 133.22 (phenyl), 129.79 (phenyl), 10.72 (CH$_3$), 2.45 (CH), 1.78 (SiMe$_3$). $^{29}$Si NMR (benzene-d$_6$, 25° C., ppm): −27.61 (SiH$_2$Ph), 3.94 (SiMe$_3$).

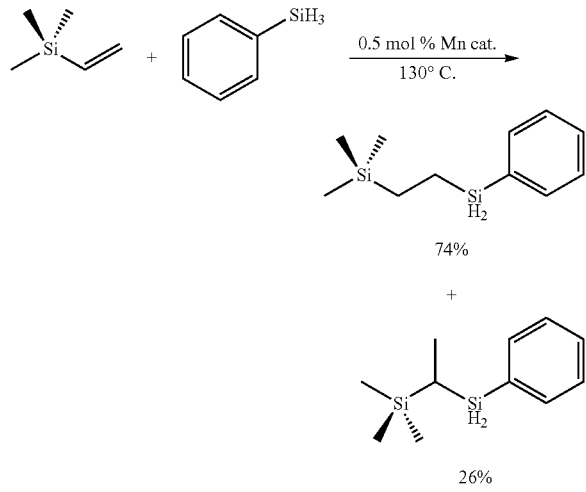

Example 7: Hydrosilylation of Allyltrimethylsilane Catalyzed by 0.5 Mol % of [($^{iPr2Ph}$BDI)Mn(μ-H)]$_2$ (1 mol % based on Mn)

In the glove box, PhSiH$_3$ (78.2 μL, 0.633 mmol) and allyltrimethylsilane (100.6 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 38 h of heating, greater than 99% conversion was observed. The tube was then brought back into the glove box and the solution was dried under vacuum. The residue was filtered with pentane (3 mL) through Celite to separate the insoluble catalyst from the silane product. The pentane was then removed under vacuum to isolate an oil identified as PhSiH$_2$(CH$_2$)$_3$Si(CH$_3$)$_3$ (0.110 g, 78%). $^1$H NMR (benzene-d$_6$, 25° C., ppm): 7.52 (m, 2H, phenyl), 7.17 (m, 3H, phenyl), 4.53 (m, 2H, SiH$_2$Ph), 1.49 (m, 2H, CH$_2$), 0.93 (m, 2H, CH$_2$), 0.56 (m, 2H, CH$_2$), −0.05 (m, 9H, CH$_3$). $^{13}$C NMR (benzene-d$_6$, 25° C., ppm): 135.59 (phenyl), 132.85 (phenyl), 129.85 (phenyl), 20.65 (CH$_2$), 20.14 (CH$_2$), 14.69 (CH$_2$), −1.56 (CH$_3$). $^{29}$Si NMR (benzene-d$_6$, 25° C., ppm): 0.37 (SiMe$_3$), −32.10 (SiH$_2$Ph).

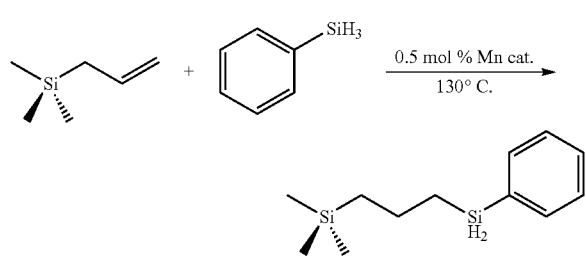

Example 8: Hydrosilylation of Allylbenzene Catalyzed by 0.5 Mol % of [($^{iPr2Ph}$BDI)Mn(μ-H)]$_2$ (1 Mol % Based on Mn)

In the glove box, PhSiH$_3$ (78.2 μL, 0.633 mmol) and allylbenzene (83.9 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 72 h of heating, greater than 99% conversion was observed. The tube was then brought back into the glove box and the solution was dried under vacuum. The residue was filtered with pentane (3 mL) through Celite to separate the insoluble catalyst from the silane product. The pentane solution was then dried under vacuum to isolate an oil identified as PhSiH$_2$(CH$_2$)$_3$Ph (0.132 g, 92%). $^1$H NMR (benzene-d$_6$, 25° C., ppm): 7.47 (m, 2H, phenyl), 7.17 (m, 5H, phenyl), 7.09 (m, 1H, phenyl), 7.04 (m, 2H, phenyl), 4.48 (t, J=3.2, 2H, SiH$_2$Ph), 2.49 (t, J=7.5, 2H, CH$_2$), 1.68 (m, 2H, CH$_2$), 0.80 (m, 2H, CH$_2$). $^{13}$C NMR (benzene-d$_6$, 25° C., ppm): 142.26 (phenyl), 135.57 (phenyl), 132.60 (phenyl), 129.88 (phenyl), 128.84 (phenyl), 128.63 (phenyl), 126.14 (phenyl), 39.27 (CH$_2$), 27.35 (CH$_2$), 9.98 (CH$_2$). $^{29}$Si NMR (benzene-d$_6$, 25° C., ppm): −31.02 (SiH$_2$Ph).

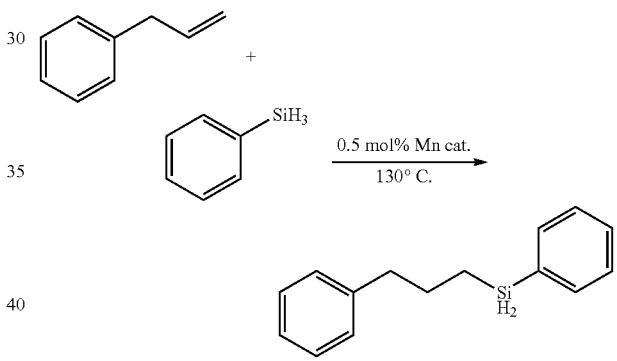

Example 9: Hydrosilylation of Vinylcyclohexane Catalyzed by 0.5 Mol % of [($^{iPr2Ph}$BDI)Mn(μ-H)]$_2$ (1 Mol % Based on Mn)

In the glove box, PhSiH$_3$ (78.2 μL, 0.633 mmol) and vinylcyclohexane (86.6 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 48 h of heating, greater than 99% conversion was observed. The tube was then brought back into the glove box and the solution was dried under vacuum. The residue was filtered with pentane (3 mL) through Celite to separate the insoluble catalyst from the silane product. The pentane solution was then dried under vacuum to isolate an oil identified as PhSiH$_2$(CH$_2$)$_2$Cy (0.110 g, 80%). $^1$H NMR (benzene-d$_6$, 25° C., ppm): 7.52 (m, 2H, phenyl), 7.17 (m, 3H, phenyl), 4.51 (t, J=3.4, 2H, SiH$_2$Ph), 1.64 (m, 5H, Cy), 1.30 (m, 2H, CH$_2$), 1.12 (m, 4H, CH$_2$), 0.81 (m, 2H, CH$_2$), 0.76 (m, 2H, CH$_2$). $^{13}$C NMR (benzene-d$_6$, 25° C., ppm): 135.58 (phenyl), 132.94 (phenyl), 129.85 (phenyl), 128.35

(phenyl), 40.52 (CH, Cy), 33.15 (CH$_2$), 32.96 (CH$_2$), 27.09 (CH$_2$), 26.75 (CH$_2$), 7.51 (CH$_2$). $^{29}$Si NMR (benzene-d$_6$, 25° C., ppm): −30.24 (SiH$_2$Ph).

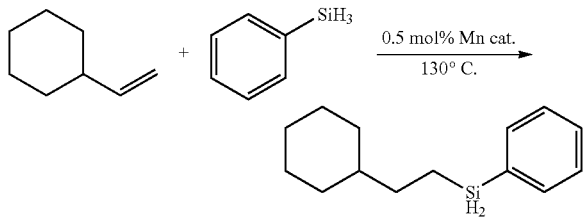

Example 10: Hydrosilylation of D-Limonene Catalyzed by 0.5 Mol % of [($^{iPr2Ph}$BDI)Mn(μ-H)]$_2$ (1 Mol % Based on Mn)

In the glove box, PhSiH$_3$ (78.2 μL, 0.633 mmol) and D-limonene (102.5 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 6 days of heating, 71% consumption was observed. $^1$H NMR (benzene-d$_6$, 25° C., ppm): 7.51 (phenyl), 7.15 (phenyl), 5.40 (=CH, ring olefin), 4.53 (SiH$_2$Ph), 2.05 (br m, 3H, CH$_2$ and CH), 1.63 (s, 3H, CH$_3$), 1.57 (br m, 3H, CH$_2$), 1.35 (br m, 1H, CH$_2$), 1.15 (br m, 1H, CH$_2$), 1.00 (br m, 1H, CH$_2$), 0.90 (br d, 3H, CH$_3$), 0.71 (br m, 1H, CH$_2$).

Example 11: Hydrosilylation of Myrcene Catalyzed by 0.5 Mol % of [($^{iPr2Ph}$BDI)Mn(μ-H)]$_2$ (1 Mol % Based on Mn)

In the glove box, PhSiH$_3$ (78.2 μL, 0.633 mmol) and isoprene (108.6 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 48 h of heating, >99% conversion of the terminal olefin was observed (terminal olefin was completely hydrosilylated). The tube was then brought back into the glove box and the solution was dried under vacuum. The residue was filtered with pentane (3 mL) through Celite to separate the insoluble catalyst from the silane product. The pentane solution was then dried under vacuum to isolate an oil identified as PhSiH$_2$(CH$_2$)$_2$C(=CH$_2$)(CH$_2$)$_2$(CH=C(CH$_3$)$_2$) (0.149 g, 96%). $^1$H NMR (benzene-d$_6$, 25° C., ppm): 7.52 (broad m, 2H, phenyl), 7.15 (broad m, 3H, phenyl), 5.23 (m, alkene CH$_2$), 5.20 (m, 1H, alkene CH), 4.54 (broad, 2H, SiH$_2$Ph), 2.16 (CH$_2$), 2.09 (CH$_2$), 1.83 (broad m, 2H, CH$_2$), 1.66 (s, 3H, CH$_3$), 1.54 (s, 3H, CH$_3$), 1.47 (broad m, 2H, CH$_2$). $^{13}$C NMR (benzene-d$_6$, 25° C., ppm): 136.33 (C, phenyl), 135.59 (CH, phenyl), 132.87 (C, alkene), 131.30 (C, alkene), 129.97 (CH, phenyl), 124.88 (CH, phenyl), 117.59 (=CH$_2$), 39.09 (CH$_2$), 27.26 (CH$_2$), 25.88 (CH$_3$), 17.80 (CH$_3$), 15.18 (CH$_2$), 13.83 (CH$_2$). $^{29}$Si NMR (benzene-d$_6$, 25° C., ppm): −35.07 (SiH$_2$Ph).

Example 12: Hydrosilylation of Styrene Catalyzed by 0.5 Mol % of [($^{iPr2Ph}$BDI)Mn(μ-H)]$_2$ (1 Mol % Based on Mn)

In the glove box, PhSiH$_3$ (78.2 μL, 0.633 mmol) and styrene (72.5 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 38 h of heating, >99% conversion was observed, which showed the major Markovnikov's product, PhSiH$_2$CH(CH$_3$)Ph (81%) along with the minor anti-Markovnikov's product PhSiH$_2$(CH$_2$)$_2$Ph (19%). The tube was then brought back into the glove box and the solution was dried under vacuum. The residue was filtered with pentane (3 mL) through Celite to separate the insoluble catalyst from the silane product. The pentane solution was then dried under vacuum to isolate an oil (0.125 g, 93%), which contains PhSiH$_2$CH(CH$_3$)Ph (89% of the isolated product) and PhSiH$_2$(CH$_2$)$_2$Ph (11% of the isolated product). PhSiH$_2$CH(CH$_3$)Ph: $^1$H NMR (benzene-d$_6$, 25° C., ppm): 7.37 (m, 2H, phenyl), 7.18-7.11 (m, 5H, phenyl), 7.04 (m, 3H, phenyl), 4.51 (t, J=3.2 Hz, 2H, SiH$_2$Ph), 2.44 (m, 1H, CH), 1.37 (d, J=7.5 Hz, 3H, CH$_3$). $^{13}$C NMR (benzene-d$_6$, 25° C., ppm): 144.70 (phenyl), 136.02 (phenyl), 131.61 (phenyl), 130.05 (phenyl), 128.74 (phenyl), 128.18 (phenyl), 127.49 (phenyl), 125.44 (phenyl), 25.68 (CH), 16.54 (CH$_3$). $^{29}$Si NMR (benzene-d$_6$, 25° C., ppm): −21.17 (SiH$_2$Ph). PhSiH$_2$(CH$_2$)$_2$Ph: $^1$H NMR (benzene-d$_6$, 25° C., ppm): 7.47 (m, phenyl), 4.48 (t, SiH$_2$Ph), 2.65 (m, CH$_2$), 1.14 (CH$_2$). $^{13}$C NMR (benzene-d$_6$, 25° C., ppm): 144.09 (phenyl), 135.59 (phenyl), 132.33 (phenyl), 129.93 (phenyl), 126.14 (phenyl), 31.41 (CH$_2$), 12.34 (CH$_2$). $^{29}$Si NMR (benzene-d$_6$, 25° C., ppm): −31.30 (SiH$_2$Ph).

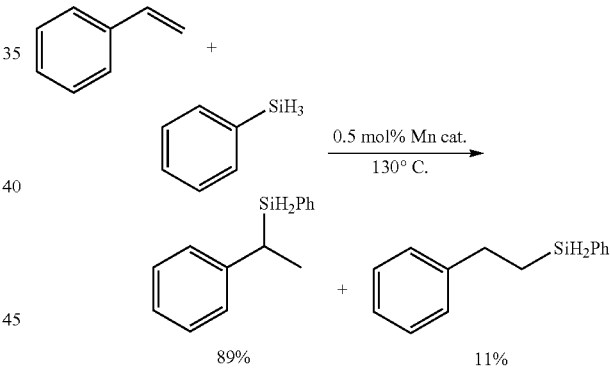

Example 13: Hydrosilylation of 4-tert-butyl Styrene Catalyzed by 0.5 mol % of [($^{iPr2Ph}$BDI)Mn(μ-H)]$_2$ (1 Mol % Based on Mn)

In the glove box, PhSiH$_3$ (78.2 μL, 0.633 mmol) and 4-tert-butyl styrene (115.9 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 38 h of heating, >99% conversion was observed, which showed the formation of major Markovnikov's product, PhSiH$_2$CH(CH$_3$)(4-$^t$BuC$_6$H$_4$) (84%) along with the minor anti-Markovnikov's product PhSiH$_2$(CH$_2$)$_2$(4-$^t$BuC$_6$H$_4$) (16%). The tube was then brought back into the glove box and the solution was dried under vacuum. The residue was filtered with pentane (3 mL) through Celite to separate the insoluble catalyst from the silane product. The pentane solution was then dried under vacuum to isolate an oil (0.117 g, 69%), which contains PhSiH$_2$CH(CH$_3$)(4-$^t$BuC$_6$H$_4$) (85% of the isolated product) and PhSiH$_2$(CH$_2$)$_2$(4-$^t$BuC$_6$H$_4$) (15% of the isolated product). PhSiH$_2$CH(CH$_3$)(4-$^t$BuC$_6$H$_4$): $^1$H NMR (benzene-d, 25° C., ppm): 7.37 (m, 2H, phenyl), 7.25 (m, 2H, phenyl) 7.13-7.05 (m, 5H, phenyl), 4.51 (m, SiH$_2$Ph), 2.47 (m, 1H, CH), 1.38 (d, J=7.6 Hz, 3H, CH$_3$), 1.24 (s, 9H, CMe$_3$). $^{13}$C NMR (benzene-d, 25° C., ppm): 147.89 (phenyl), 141.65 (phenyl), 136.02 (phenyl), 131.85 (phenyl), 130.01 (phenyl), 128.18 (phenyl), 127.24 (phenyl), 125.65 (phenyl), 34.36 (CMe$_3$), 31.60 (CMe$_3$), 25.07 (CH), 16.79 (CH$_3$). $^{29}$Si NMR (benzene-d, 25° C., ppm): −20.84 (SiH$_2$Ph). PhSiH$_2$(CH$_2$)$_2$(4-$^t$BuC$_6$H$_4$): $^1$H NMR (benzene-d, 25° C., ppm): 7.45 (phenyl), 7.36 (phenyl), 4.42 (SiH$_2$Ph), 2.64 (CH$_2$), 1.76 (CH$_2$), 1.25 (CMe$_3$). $^{13}$C NMR (benzene-d, 25° C., ppm): 148.67 (phenyl), 141.10 (phenyl), 137.75 (phenyl), 135.59 (phenyl), 129.33 (phenyl), 128.56 (phenyl), 126.46 (phenyl), 31.47, 22.76, 21.52, 14.36. $^{29}$Si NMR (benzene-d, 25° C., ppm): −30.73 (SiH$_2$Ph).

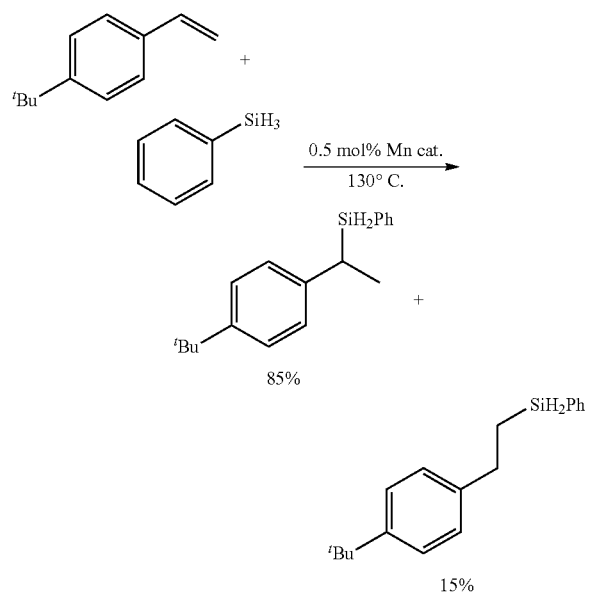

Example 14: Hydrosilylation of trans-β-Methylstyrene Catalyzed by 0.5 Mol % of [($^{iPr2Ph}$BDI)Mn(μ-H)]$_2$ (1 Mol % Based on Mn)

In the glove box, PhSiH$_3$ (78.2 μL, 0.633 mmol) and trans-P-methyl styrene (82.2 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 36 h of heating, >99% conversion was observed, which showed the formation of Markovnikov's product, PhSiH$_2$CH(Et)Ph along with traces of anti-Markovnikov's product PhSiH$_2$CH(CH$_3$)(CH$_2$Ph). The tube was then brought back into the glove box and the solution was dried under vacuum. The residue was filtered with pentane (3 mL) through Celite to separate the insoluble catalyst from the silane product. The pentane solution was then dried under vacuum to isolate an oil (0.109 g, 76%), which contains PhSiH$_2$CH(Et)Ph (94% of the isolated product) and PhSiH$_2$CH(CH$_3$)(CH$_2$Ph) (6% of the isolated product). PhSiH$_2$CH(Et)Ph: $^1$H NMR (benzene-d, 25° C., ppm): 7.34 (m, 2H, phenyl), 7.16-7.05 (m, 5H, phenyl), 6.99 (m, 3H, phenyl), 4.52 (d, J=3.1, 2H, SiH$_2$Ph), 2.21 (m, 1H, CH), 1.80 (m, 2H, CH$_2$), 0.83 (t, J=7.3, 3H, CH$_3$). $^{13}$C NMR (benzene-d$_6$, 25° C., ppm): 142.93 (phenyl), 136.09 (phenyl), 131.68 (phenyl), 130.01 (phenyl), 128.79 (phenyl), 128.29 (phenyl), 128.16 (phenyl), 125.50 (phenyl), 34.72 (CH), 24.90 (CH$_2$), 14.10 (CH$_3$). $^{29}$Si NMR (benzene-d$_6$, 25° C., ppm): −23.96 (SiH$_2$Ph). 6% of the anti-Markovnikov's product, PhSiH$_2$CH(CH$_3$)(CH$_2$Ph) was observed at 7.61 (phenyl), 7.52 (phenyl), 1.20, 1.17, and 0.88 ppm in the $^1$H NMR and a small peak at −33.73 ppm in the $^{29}$Si NMR spectra.

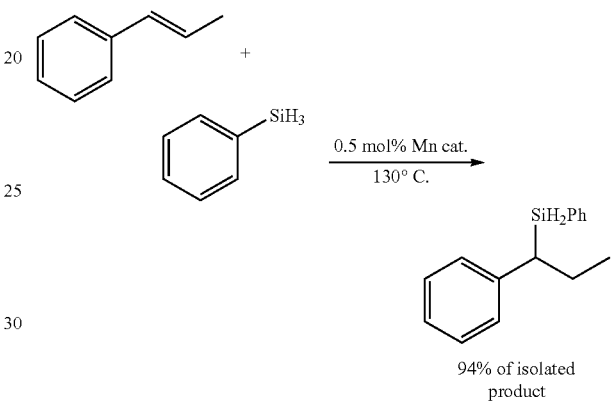

Example 15: Hydrosilylation of cis-β-methylstyrene Catalyzed by 0.5 Mol % of [($^{iPr2Ph}$BDI)Mn(μ-H)]$_2$ (1 Mol % Based on Mn)

In the glove box, PhSiH$_3$ (78.2 μL, 0.633 mmol) and cis-P-methyl styrene (82.2 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 36 h of heating, >99% conversion was observed, which showed only the Markovnikov's product, PhSiH$_2$CH(Et)Ph. The tube was then brought back into the glove box and the solution was dried under vacuum. The residue was filtered with pentane (3 mL) through Celite to separate the insoluble catalyst from the silane product. The pentane solution was then dried under vacuum to isolate an oil (0.128 g, 89%). PhSiH$_2$CH(Et)Ph: $^1$H NMR (benzene-d$_6$, 25° C., ppm): 7.34 (d, J=7.3, 2H, phenyl), 7.10 (m, 5H, phenyl), 6.99 (m, 3H, phenyl), 4.52 (d, J=2.9, 2H, SiH$_2$Ph), 2.21 (m, 1H, CH), 1.81 (m, 2H, CH$_2$), 0.83 (t, J=7.2, 3H, CH$_3$). $^{13}$C NMR (benzene-d$_6$, 25° C., ppm): 142.93 (phenyl), 136.08 (phenyl), 131.68 (phenyl), 130.01 (phenyl), 128.78 (phenyl), 128.30 (phenyl), 128.16 (phenyl), 125.50 (phenyl), 34.72 (CH), 24.90 (CH$_2$), 14.10 (CH$_3$). $^{29}$Si NMR (benzene-d$_6$, 25° C., ppm): −23.88 (SiH$_2$Ph). Less than 5% of the anti-Markovnikov's product, PhSiH$_2$CH(CH$_3$)(CH$_2$Ph) was observed at 7.52 (phenyl), 1.65 (CH), 1.28 (CH$_2$), and 0.88 (CH$_3$) ppm in the $^1$H NMR and a small peak at −33.66 ppm in the $^{29}$Si NMR spectra.

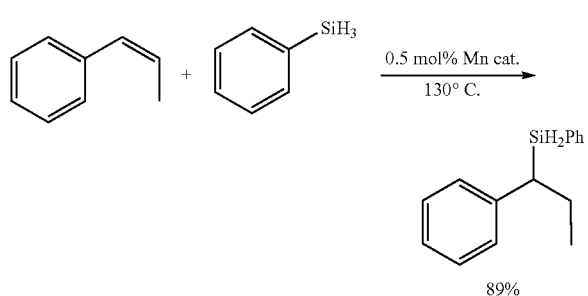

89%

Example 16: Hydrosilylation of α-Methylstyrene Catalyzed by 0.5 Mol % of [($^{iPr2Ph}$BDI)Mn(μ-H)]$_2$ (1 Mol % Based on Mn)

In the glove box, PhSiH$_3$ (78.2 μL, 0.633 mmol) and a-methylstyrene (82.2 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 4 days of heating, only 56% conversion to Anti-Markovnikov's product, PhSiH$_2$CH$_2$CH(CH$_3$)(Ph), was observed and prolonged heating did not afford further conversion. $^1$H NMR (benzene-d$_6$, 25° C., ppm): 7.50 (m, phenyl), 7.15 (m, phenyl), 4.39 (br, 2H, SiH$_2$Ph), 2.82 (br m, 1H, CH), 1.22 (d, J=6.1 Hz, 3H, CH$_3$), 1.14 (br m, 2H, CH$_2$).

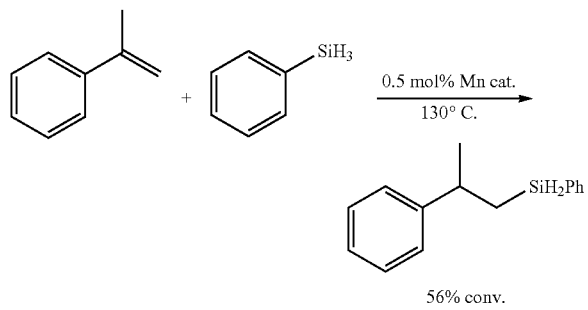

56% conv.

Example 17: Hydrosilylation of 4-Methylstyrene Catalyzed by 0.5 Mol % of [($^{iPr2Ph}$BDI)Mn(μ-H)]$_2$ (1 Mol % Based on Mn)

In the glove box, PhSiH$_3$ (75.6 μL, 0.612 mmol) and 4-methyl styrene (80.8 μL, 0.612 mmol) were added to a J. Young tube containing a benzene-d$_6$ solution of [($^{iPr2Ph}$BDI)Mn(μ-H)]$_2$ (0.0029 g, 0.00306 mmol). The tube was sealed under N$_2$ atmosphere and heated at 130° C. The progress of the reaction was monitored closely by examining the consumption of starting alkene resonances in the $^1$H NMR spectrum. After 4 days of heating, >99% conversion was observed, which showed the formation of major Markovnikov's product, PhSiH$_2$CH(CH$_3$)(Me-C$_6$H$_4$). The tube was then brought back into the glove box and the solution was dried under vacuum. The residue was filtered with pentane (3 mL) through Celite to separate the insoluble catalyst from the silane product. The pentane solution was then dried under vacuum to isolate an oil (0.114 g, 82%). PhSiH$_2$CH(CH$_3$)(Me-C$_6$H$_4$) (80% of the isolated mixture): $^1$H NMR (benzene-d$_6$, 25° C., ppm): 7.51 (d, J=6.1, 1H, phenyl), 7.37 (d, J=6.2 Hz, 2H, phenyl), 7.14-7.08 (m, 5H, phenyl), 4.51 (broad, 2H, SiH$_2$Ph), 2.44 (m, 1H, CH), 2.12 (s, 3H, CH$_3$), 1.37 (d, J=7.1, 3H, CH$_3$). $^{13}$C NMR (benzene-d$_6$, 25° C., ppm): 141.61 (phenyl), 136.04 (phenyl), 131.81 (phenyl), 130.01 (phenyl), 129.49 (phenyl), 128.47 (phenyl), 128.18 (phenyl), 127.43 (phenyl), 25.19 (CH), 21.04 (CH$_2$), 16.75 (CH$_3$). $^{29}$Si NMR (benzene-d$_6$, 25° C., ppm): −21.45 (SiH$_2$Ph). 20% of the isolated product contains the anti-Markovnikov's product PhSiH$_2$(CH$_2$)$_2$(Me-C$_6$H$_4$): $^1$H NMR (benzene-d$_6$, 25° C., ppm): 7.45 (phenyl), 7.30 (phenyl), 6.97 (phenyl), 4.47 (SiH$_2$Ph), 2.64 (CH$_2$), 2.15 (CH$_3$), 1.37 (CH$_2$). $^{13}$C NMR (benzene-d$_6$, 25° C., ppm): 141.03 (phenyl), 135.60 (phenyl), 135.26 (phenyl), 134.53 (phenyl), 132.47 (phenyl), 131.71 (phenyl), 130.15 (phenyl), 129.36 (phenyl), 31.03 (CH$_2$), 21.13 (CH$_2$), 12.52 (CH$_3$). $^{29}$Si NMR (benzene-d$_6$, 25° C., ppm): −33.75 (SiH$_2$Ph).

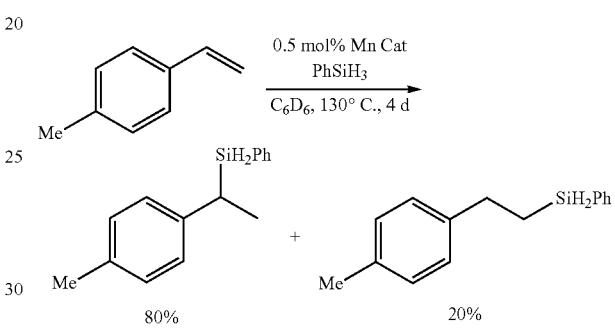

80%    20%

Example 18: Hydrosilylation of 4-diphenylphosphino Styrene Catalyzed by 0.5 Mol % of [($^{iPr2Ph}$BDI)Mn(μ-H)]$_2$ (1 Mol % Based on Mn)

In the glove box, PhSiH$_3$ (75.6 μL, 0.612 mmol) and 4-diphenylphosphino styrene (0.176 g, 0.612 mmol) were added to a J. Young tube containing a benzene-d$_6$ solution of [($^{iPr2Ph}$BDI)Mn(μ-H)]$_2$ (0.0029 g, 0.00306 mmol). The tube was sealed under N$_2$ atmosphere and heated at 130° C. The progress of the reaction was monitored closely by examining the consumption of starting alkene resonances in the $^1$H NMR spectrum. After 3 days of heating, >99% conversion was observed, which showed only the Markovnikov's product, PhSiH$_2$CH(CH$_3$)(Ph$_2$P—C$_6$H$_4$). The tube was then brought back into the glove box and the solution was dried under vacuum. The residue was filtered with pentane (3 mL) through Celite to separate the insoluble catalyst from the silane product. The pentane solution was then dried under vacuum to isolate an oil identified as PhSiH$_2$CH(CH$_3$)(Ph$_2$P—C$_6$H$_4$) (0.190 g, 78%). PhSiH$_2$CH(CH$_3$)(Ph$_2$P—C$_6$H$_4$): $^1$H NMR (benzene-d$_6$, 25° C., ppm): 7.44-7.40 (m, 4H, phenyl), 7.36-7.32 (m, 2H, phenyl), 7.29 (m, 2H, phenyl), 7.13-7.06 (m, 9H, phenyl), 6.90 (m, 2H, phenyl), 4.43 (d, J=3.2, 2H, SiH$_2$Ph), 2.34 (m, 1H, CH), 1.27 (d, J=7.4, 3H, CH$_3$). $^{13}$C NMR (benzene-d$_6$, 25° C., ppm): 145.68 (phenyl), 138.45 (phenyl), 136.00 (phenyl), 134.64 (phenyl), 134.44 (phenyl), 134.22 (phenyl), 134.03 (phenyl), 131.38 (phenyl), 130.11 (phenyl), 128.82 (phenyl), 128.76 (phenyl), 128.17 (phenyl), 25.64 (CH), 16.21 (CH$_3$). $^{29}$Si NMR (benzene-d$_6$, 25° C., ppm): −21.25 (SiH$_2$Ph). $^{31}$P NMR (benzene-d$_6$, 25° C., ppm): −6.29 (PPh$_2$).

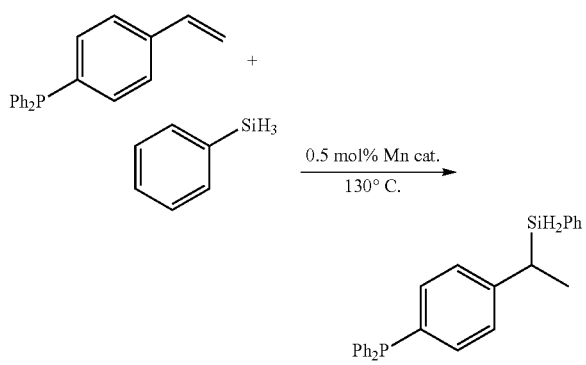

Example 19: Hydrosilylation of 9-vinylcarbazole Catalyzed by 0.5 Mol % of [($^{iPr2Ph}$BDI)Mn(μ-H)]$_2$ (1 Mol % Based on Mn)

In the glove box, a benzene-d$_6$ solution of PhSiH$_3$ (75.6 μL, 0.612 mmol) and 9-vinylcarbazole (118.3 mg, 0.612 mmol) was added to a J. Young tube containing a benzene-d$_6$ solution of [($^{iPr2Ph}$BDI)Mn(μ-H)]$_2$ (0.0029 g, 0.00306 mmol). The tube was sealed under N$_2$ atmosphere and heated at 130° C. The progress of the reaction was monitored closely by examining the consumption of starting alkene resonances in the $^1$H NMR spectrum. After 4 days of heating, only 39% conversion was observed, which showed a mixture of Markovnikov's product and anti-Markovnikov's product. Prolonged heating did not afford complete conversion and resulted other unidentified products. Anti-Markovnikov's product: $^1$H NMR (benzene-d$_6$): 7.49 (m, phenyl), 7.20 (m, phenyl), 4.46 (SiH$_2$Ph), 0.96 (br, 2H, CH$_2$), 0.82 (br, CH$_2$). Markovnikov's product: $^1$H NMR (benzene-d$_6$): 7.56 (m, phenyl), 7.07 (m, phenyl), 4.48 (SiH$_2$Ph), 1.59 (br, CH), 1.14 (br d, 3H, CH$_3$).

Example 20: Hydrosilylation of Styrene Catalyzed by 0.5 Mol % of [($^{iPr2Ph}$BDI)Mn(μ-O$^t$Bu)]$_2$ (1.0 Mol % Based on Mn)

In the glove box, PhSiH$_3$ (67.8 μL, 0.5498 mmol) and styrene (62.9 μL, 0.5498 mmol) were added to a J. Young tube containing a benzene-d$_6$ solution of [($^{iPr2Ph}$BDI)Mn(μ-O$^t$Bu)]$_2$ (0.003 g, 0.002749 mmol). The tube was sealed under N$_2$ atmosphere and heated at 130° C. The progress of the reaction was monitored closely by examining the consumption of starting alkene resonances in the $^1$H NMR spectrum. After 24 h of heating, >99% conversion was observed, which showed the formation of Markovnikov's product PhSiH$_2$CH(CH$_3$)(Ph). $^1$H NMR (benzene-d$_6$, 25° C., ppm): 7.34 (m, 2H, phenyl), 7.13-7.08 (m, 5H, phenyl), 7.02 (m, 3H, phenyl), 4.48 (br d, 2H, SiH$_2$Ph), 2.41 (br m, 1H, CH), 1.34 (d, J=7.2 Hz, 3H CH$_3$).

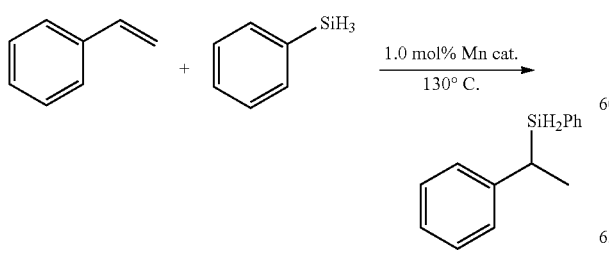

Example 21: Hydrosilylation of 4-tert-butyl Styrene Catalyzed by 1.0 Mol % of ($^{iPr2Ph}$BDI)Mn(CH(CH$_3$)(4-$^t$BuPh))

To a benzene-d$_6$ solution of ($^{iPr2Ph}$BDI)Mn(CH(CH$_3$)(4-$^t$BuPh)) (0.004 g, 0.00631 mmol) in a J. Young tube, PhSiH$_3$ (77.8 μL, 0.631 mmol) and 4-tert-butylstyrene (115 μL, 0.631 mmol) were added and sealed under N$_2$ atmosphere. The tube was then heated at 130° C. for 24 h. After 24 h, >99% conversion was observed by $^1$H NMR spectroscopy. The product showed the formation of Markovnikov's silane PhSiH$_2$CH(CH$_3$)(Ar). $^1$H NMR (benzene-d$_6$, 25° C., ppm): 7.40 (m, phenyl), 7.07 (m, phenyl), 4.49 (SiH$_2$Ph), 2.50 (br, 1H, CH), 1.76 (br, 3H, CH$_3$), 1.24 (br, $^t$Bu).

Examples 22-24

Preparation of Silicones Via Alkene Hydrosilylation Employing the Disclosed Metal Complexes

Example 22: Stoichiometric Cross-Linking of Vinyl-Terminated Poly(Dimethylsiloxane) and Polymethylhydrosiloxane Using [($^{iPr2Ph}$BDI)Mn(μ-H)]$_2$ In the glove box a Schlenk tube was charged with vinyl-terminated poly(dimethylsiloxane) (0.4 mL) and polymethylhydrosiloxane (0.9 mL). A 2 mL toluene solution of [($^{iPr2Ph}$BDI)Mn(μ-H)]$_2$ (0.0095 g) was added to it, sealed under N$_2$ and heated at 130° C. for 48 h. The resulting solid was washed with hexane and dichloromethane and dried thoroughly to isolate a white silicone powder (0.820 g).

The product of this reaction is shown below:

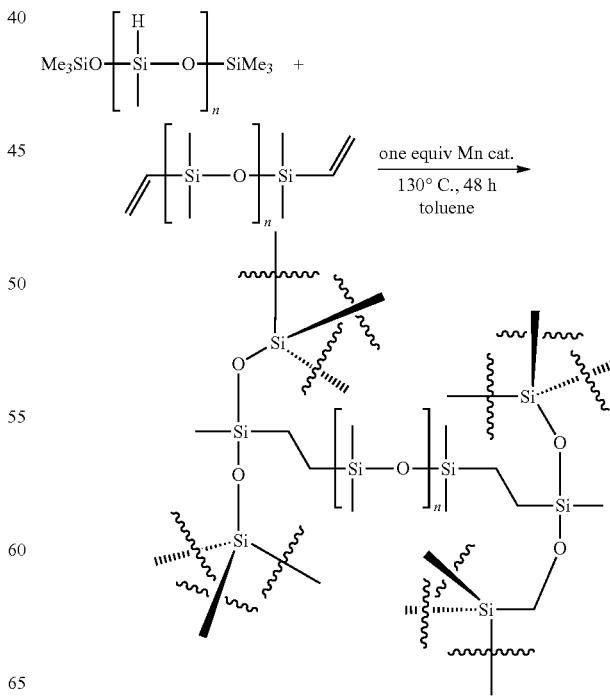

Example 23: Catalytic Cross-Linking of Vinyl-Terminated Poly(Dimethylsiloxane) and Polymethylhydrosiloxane Using 20 Mol % of [($^{iPr2Ph}$BDI)Mn(μ-O$^t$Bu)]$_2$ In the glove box a scintillation vial was charged with [($^{iPr2Ph}$BDI)Mn(μ-O$^t$Bu)]$_2$ (0.004 g, 0.00845 mmol). Then the vinyl-terminated poly(dimethylsiloxane) (1.094 mL, 0.0422 mmol) and polymethylhydrosiloxane (40 μL, 0.634 mmol) were added to it. The vial was capped under N$_2$ and heated at 130° C. for 4 d. The yellow mixture upon cooling afforded a high viscosity gel, which upon exposure to air turned brown as a result of catalyst deactivation. The gel was vigorously stirred with isopropanol (15 mL) and then the yellow isopropanol wash was decanted off. This was repeated once more and finally the material was dried to isolate a gummy solid (0.839 g). The product of this reaction is shown below:

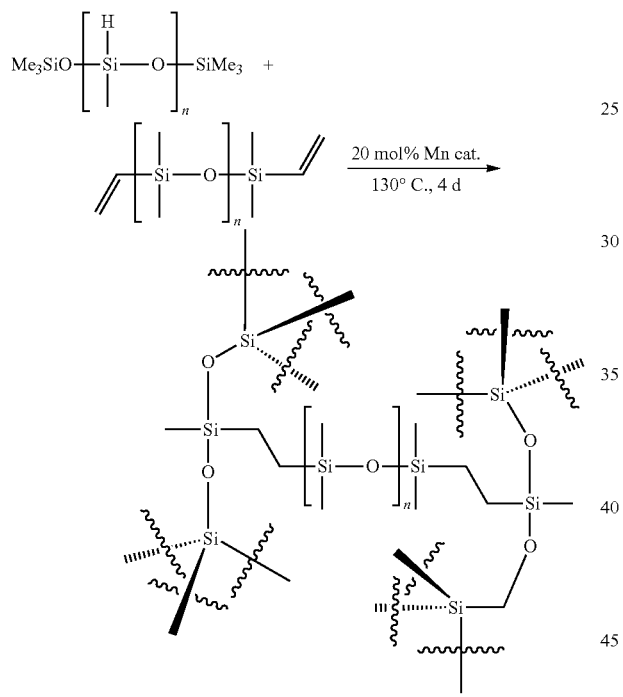

Example 24: Catalytic Cross-Linking of 1,2,4-trivinylcyclohexane and Polymethylhydrosiloxane Using 0.1 Mol % of [($^{iPr2Ph}$BDI)Mn(μ-H)]$_2$ In the glove box, a vial was charged with [($^{iPr2Ph}$BDI)Mn(μ-H)]$_2$ (0.005 g, 0.005279 mmol). Polymethylhydrosiloxane (1.035 mL, 15.837 mmol) was then added to the vial in portions to transfer the catalyst slurry into a Schlenk flask. To the slurry in the flask, was then added the 1,2,4-trivinylcyclohexane (1.023 mL, 5.279 mmol) and the flask was sealed under N$_2$ atmosphere. The neat mixture was heated at 130° C. for 5 days during which time a yellow oil was formed. The flask was cooled to room temperature and the mixture was exposed to air to deactivate the catalyst. The resulting brown oil was transferred into a vial and stirred vigorously with isopropanol (15 mL). From the two layers, the top brown layer was decanted off and the gluey residue was allowed to dry at room temperature. After 2 days, a clear colorless gummy solid was obtained (0.805 g). The product of this reaction is shown below:

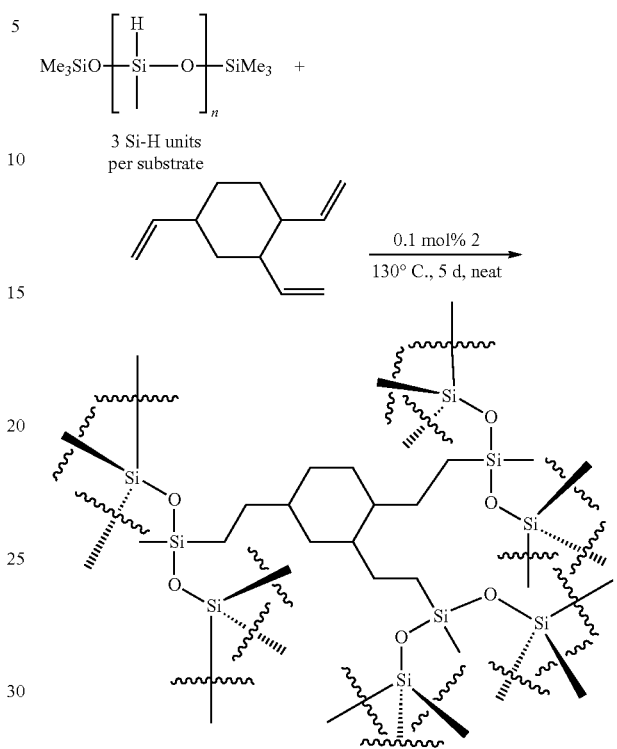

Examples 25-28

Alkene Hydroboration Reactions Employing the Disclosed Metal Complexes

Example 25: Hydroboration of Styrene Catalyzed by 0.5 Mol % of [($^{iPr2Ph}$BDI)Mn(μ-H)]$_2$ (1 Mol % Based on Mn)

In the glove box, HBPin (91.9 μL, 0.633 mmol) and styrene (72.5 μL, 0.633 mmol) were added to a J. Young tube containing a benzene-d$_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectrum. After 24 h of heating, 95% conversion was observed, which showed the formation of anti-Markovnikov's product PinB(CH$_2$)$_2$(Ph) (73%) and Markovnikov's product PinBCH(CH$_3$)(Ph) (27%). PinB(CH$_2$)$_2$(Ph) (73%): $^1$H NMR (benzene-d$_6$, 25° C., ppm): 7.15 (m, 3H, phenyl), 7.04 (m, 2H, phenyl), 2.83 (t, J 7.2 Hz, 2H, CH$_2$), 1.24 (t, J 7.0 Hz, 2H, CH$_2$), 1.01 (s, 12H, BPin). PinBCH(CH$_3$)(Ph) (27%): $^1$H NMR (benzene-d$_6$, 25° C., ppm): 7.31 (m, 2H, phenyl), 7.14 (m, 3H, phenyl), 2.54 (m, 1H, CH), 1.45 (d, J 7.0 Hz, 3H, CH$_3$), 0.97 (s, 12H, BPin).

Example 26: Hydroboration of Allylbenzene Catalyzed by 0.5 Mol % of [($^{iPr2Ph}$BDI)Mn(μ-H)]$_2$ (1 Mol % Based on Mn)

In the glove box, HBPin (91.9 μL, 0.633 mmol) and allylbenzene (83.8 μL, 0.633 mmol) were added to a J.

Young tube containing a benzene-$d_6$ solution of [($^{iPr2Ph}$BDI)Mn(μ-H)]$_2$ (0.003 g, 0.00317 mmol). The tube was sealed under N$_2$ atmosphere and heated at 130° C. The progress of the reaction was monitored closely by examining the consumption of starting alkene resonances in the $^1$H NMR spectra. After 24 h of heating, 98% conversion was observed, which showed the formation of only anti-Markovnikov's product PinB(CH$_2$)$_3$(Ph). $^1$H NMR (benzene-$d_6$, 25° C., ppm): 7.15 (m, 2H, phenyl), 7.05 (m, 3H, phenyl), 2.58 (t, J=7.2 Hz, 2H, CH$_2$), 1.84 (m, 2H, CH$_2$), 1.01 (s, 12H, BPin), 0.92 (t, J=7.0 Hz, 2H, CH$_2$).

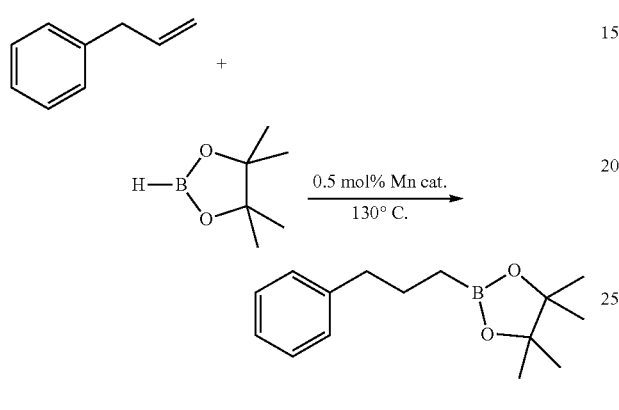

Example 27: Hydroboration of Styrene Catalyzed by 0.5 Mol % of [($^{iPr2Ph}$BDI)Mn(μ-O$^t$Bu)]$_2$ (1.0 Mol % Based on Mn)

In the glove box, HBPin (79.7 μL, 0.5498 mmol) and styrene (62.9 μL, 0.5498 mmol) were added to a J. Young tube containing a benzene-$d_6$ solution of [($^{iPr2Ph}$BDI)Mn(μ-O$^t$Bu)]$_2$ (0.003 g, 0.005498 mmol). The tube was sealed under N$_2$ atmosphere and heated at 130° C. The progress of the reaction was monitored closely by examining the consumption of starting alkene resonances in the $^1$H NMR spectrum. After 16 h of heating, >99% conversion was observed, which showed the formation of anti-Markovnikov's product PinB(CH$_2$)$_2$(Ph) (84%) and Markovnikov's product PinBCH(CH$_3$)(Ph) (16%). PinB(CH$_2$)$_2$(Ph) (84%): $^1$H NMR (benzene-$d_6$, 25° C., ppm): 7.18 (m, 3H, phenyl), 7.04 (m, 2H, phenyl), 2.83 (t, J=7.3 Hz, 2H, CH$_2$), 1.22 (t, J=7.2 Hz, 2H, CH$_2$), 1.01 (s, 12H, BPin). PinBCH(CH$_3$)(Ph) (16%): $^1$H NMR (benzene-$d_6$, 25° C., ppm): 7.32 (m, 2H, phenyl), 7.14 (m, 3H, phenyl), 2.55 (m, 1H, CH), 1.45 (d, J=7.0 Hz, 3H, CH$_3$), 0.98 (s, 12H, BPin).

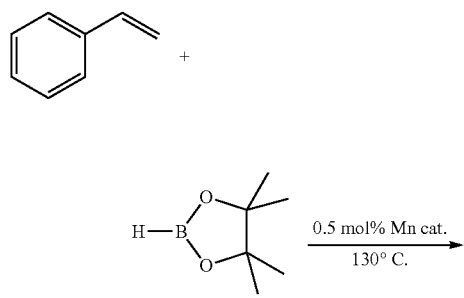

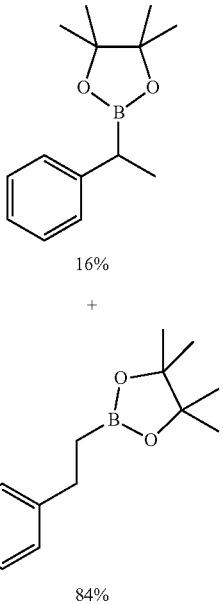

16%

+

84%

Example 28: Hydroboration of 4-Tert-Butylstyrene Catalyzed by 1.0 Mol % of ($^{iPr2Ph}$BDI)Mn(CH(CH$_3$)(4-$^t$BuPh))

To a benzene-$d_6$ solution of ($^{iPr2Ph}$BDI)Mn(CH(CH$_3$)(4-$^t$BuPh)) (0.0045 g, 0.0071 mmol) in a J. Young tube, HBPin (102.9 μL, 0.709 mmol) and 4-tert-butylstyrene (128 L, 0.709 mmol) were injected and sealed under N$_2$ atmosphere. The tube was then heated at 130° C. for 24 h. After 24 h>99% conversion was observed in the $^1$NMR spectrum. The product showed the formation of a mixture of Markovnikov's silane PinBCH(CH$_3$)(Ar) (12%) and anti-Markovnikov's silane PinB(CH$_2$)$_2$(Ar) (88%). PinBCH(CH$_3$)(Ar) (12%): $^1$H NMR (benzene-$d_6$, 25° C., ppm): 7.22 (m, phenyl), 7.20 (m, phenyl), 1.67 (m, 1H, CH), 1.40 (d, J=6.4 Hz, 3H, CH$_3$), 1.17 (s, 9H, $^t$Bu), 0.91 (s, 12H, BPin methyl). PinB(CH$_2$)$_2$(Ar) (88%): $^1$H NMR (benzene-$d_6$): 7.14 (m, phenyl), 7.10 (m, phenyl), 2.79 (br t, 2H, CH$_2$), 1.20 (t, 2H, CH$_2$), 1.16 (s, 9H, $^t$Bu), 0.96 (s, 12H, BPin methyl).

Examples 29-31

Exemplary Preparation Methods for Manganese Complexes Featuring Mn—Mn Bonding

Example 29: Synthesis of bis[N,N-(1,3-dimethyl-1,3-propanediylidene)Bis[2,6-bis(1-methylethyl)benzenaminato-κN]dimanganese-di-μ-gydride (Hereafter [($^{iPr2Ph}$BDI)Mn(μ-H)]$_2$)

A 20 mL vial was charged with [($^{iPr2Ph}$BDI)Mn(μ-Cl)]$_2$ (0.501 g, 0.986 mmol) in 10 mL toluene and cooled at −35° C. A solution of NaEt$_3$BH (1.23 mL, 1.232 mmol) in 5 mL toluene was also cooled at −35° C. After 30 min of cooling, the NaEt$_3$BH solution was slowly added to the toluene slurry of [($^{iPr2Ph}$BDI)Mn(μ-Cl)]$_2$ while stirring. A color change from yellow to dark brown was noticed along with disappearance of the yellow solids. After stirring at room temperature for 1 h, the dark brown solution was filtered through Celite. The filtrate was concentrated, layered with pentane and upon cooling at −35° C. overnight, yellowish-green crystals of [($^{iPr2Ph}$BDI)Mn(μ-H)]$_2$ (0.308 g, 0.650 mmol, 66%) were obtained. Magnetic susceptibility (Evans method, 25° C.) $\mu_{eff}$=5.17$\mu_B$. $^1$H NMR (benzene-d$_6$, 25° C., ppm): 20.10, 11.56, 5.45, −4.18. Considering the magnetic susceptibility and EPR spectrum of this complex, it is best illustrated as a mixture of the electronic structures shown below:

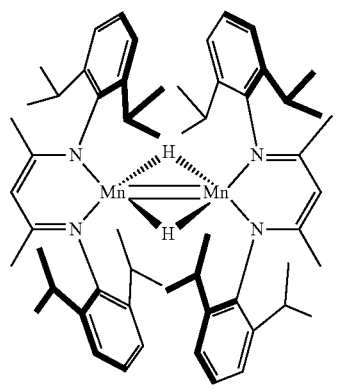

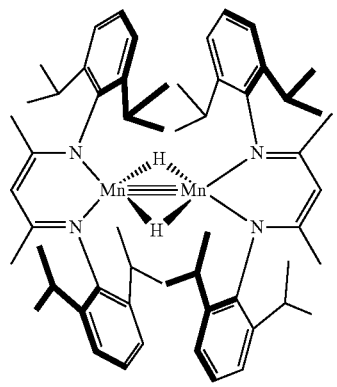

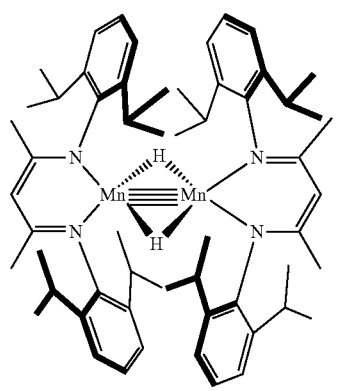

Accounting for resonance, [($^{iPr2Ph}$BDI)Mn(μ-H)]$_2$ can also be drawn as:

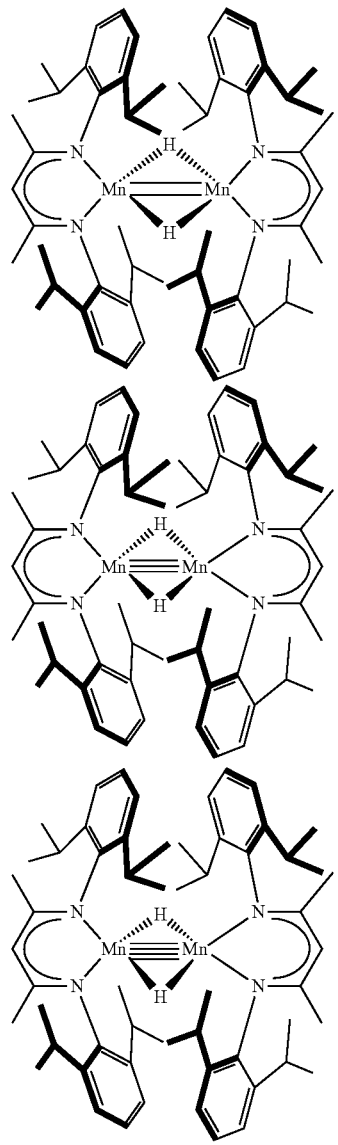

Example 30: Synthesis of bis[N,N-(1,3-dimethyl-1, 3-propanediylidene)bis[2,6-bis(1-methylethyl)benzenaminato-κN]dimanganese-di-μ-benzylamide (Hereafter [($^{iPr2Ph}$BDI)Mn(μ-NHCH$_2$Ph)]$_2$)

In the glove box, a 20 mL vial was charged with [($^{iPr2Ph}$BDI)Mn(μ-H)]$_2$ (0.0489 mg, 0.0516 mmol) in 2 mL toluene. Next, benzylamine (11.28 μL, 0.1033 mmol) was added, the greenish-yellow solution turned more yellow in color and the liberation of H$_2$ gas was observed. The vial was sealed and allowed to sit at room temperature for 1 hour and upon cooling at −35° C. overnight, yellow crystals of [($^{iPr2Ph}$BDI)Mn(μ-NHCH$_2$Ph)]$_2$ (0.0546 g, 0.0472 mmol, 91%) were obtained. This complex can be considered to possess one or more of the electronic structures shown below:

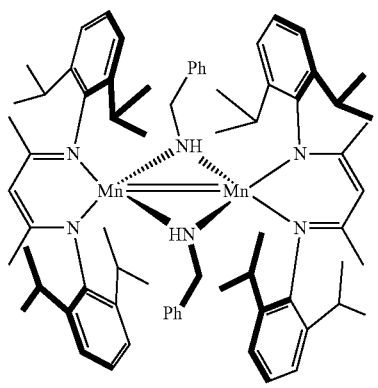

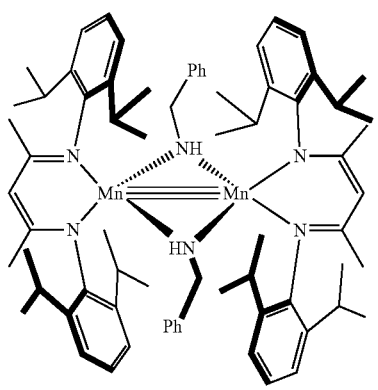

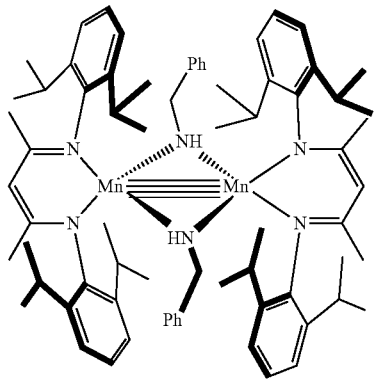

Accounting for resonance, [($^{iPr2Ph}$BDI)Mn(μ-NHCH$_2$Ph)]$_2$ can also be drawn as:

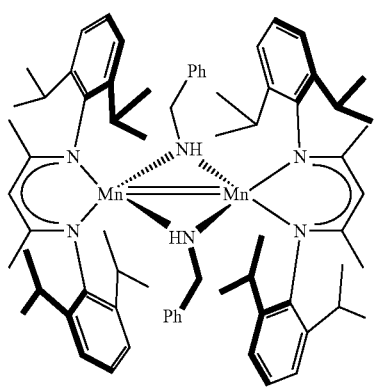

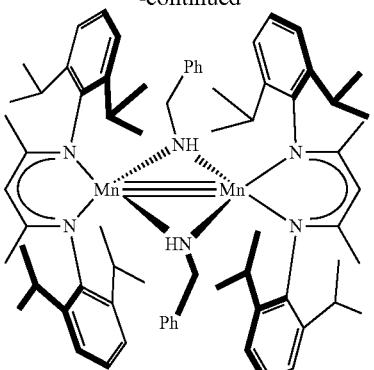

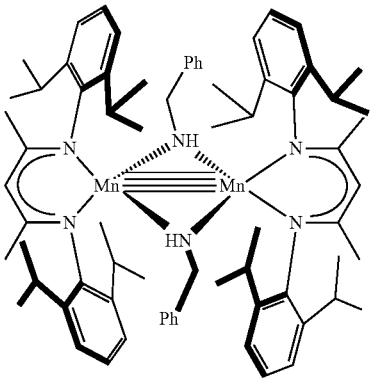

Example 31: Synthesis of [N,N'-(1,3-dimethyl-1,3-propanediylidene)bis[2,6-bis(1-methylethyl)benzenaminato-μN]manganese(η$^1$-boranide)-tetrahydrofuran [hereafter ($^{iPr2Ph}$BDI)Mn(BH$_2$)(THF)]

In the glove box, a 20 mL vial was charged with [($^{iPr2Ph}$BDI)Mn(μ-H)]$_2$ (0.0637 g, 0.0673 mmol) in 2 mL toluene. Then, a solution of 1M borane-tetrahydrofuran in THF (0.1345 mL, 0.1345 mmol) was added, the greenish yellow solution turned darker in color and the liberation of H$_2$ gas was observed. After sitting at room temperature for 1 h, the dark greenish-yellow solution was layered with pentane and upon cooling at −35° C. overnight, yellowish-green crystals of ($^{iPr2Ph}$BDI)Mn(BH$_2$)(THF) (0.0654 g, 0.1173 mmol, 87%) were obtained. The monomeric structure, consistent with General Formula G-5, was confirmed by single crystal X-ray diffraction:

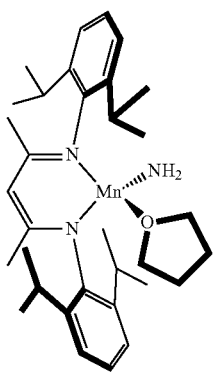

Accounting for resonance, $(^{iPr2Ph}BDI)Mn(BH_2)(THF)$ can also be drawn as:
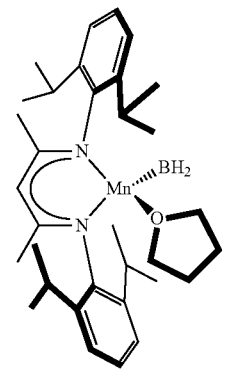
In solution, in the absence of THF, this molecule can dimerize to form a complex featuring a bridging boryl ligand, $[(^{iPr2Ph}BDI)Mn(\mu-BH_2)]_2$. This complex can possess one or more of the electronic structures shown below:
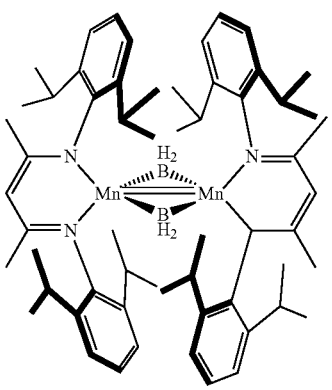
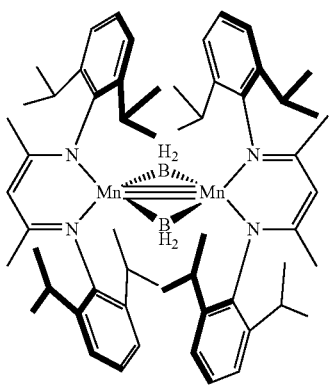
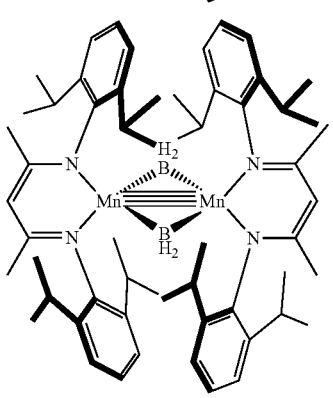
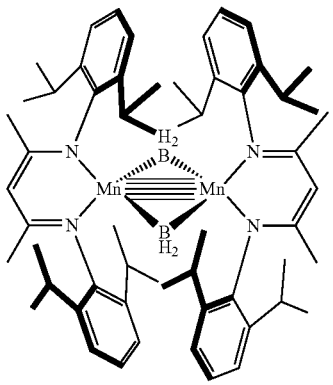
Accounting for resonance, $[(^{iPr2Ph}BDI)Mn(\mu-BH_2)]_2$ can also be drawn as:
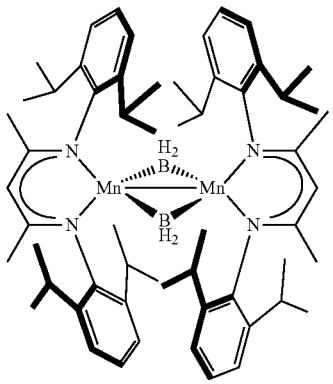

-continued

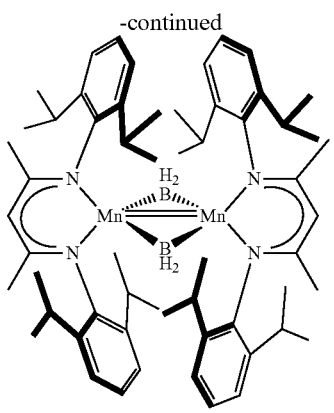
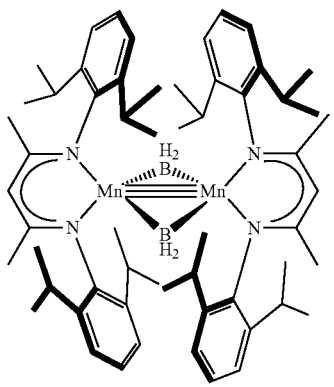
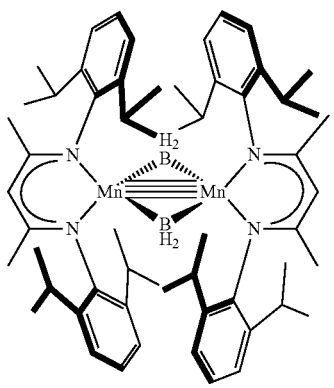
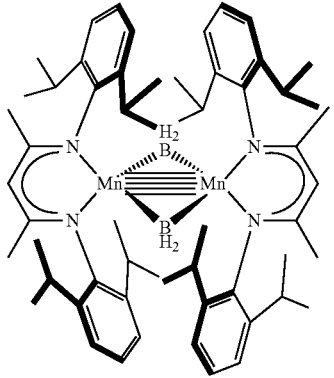

Example 32

Exemplary Demonstration of Olefin Hydrosilylation Using a Manganese Complex Featuring Mn—Mn Bonding Example 32. Hydrosilylation of 1-hexene Catalyzed by 0.5 mol % of [($^{iPr2Ph}$BDI)Mn(μ-NHCH$_2$pH)]$_2$ (1 Mol % Based on Mn)

Figure 6:
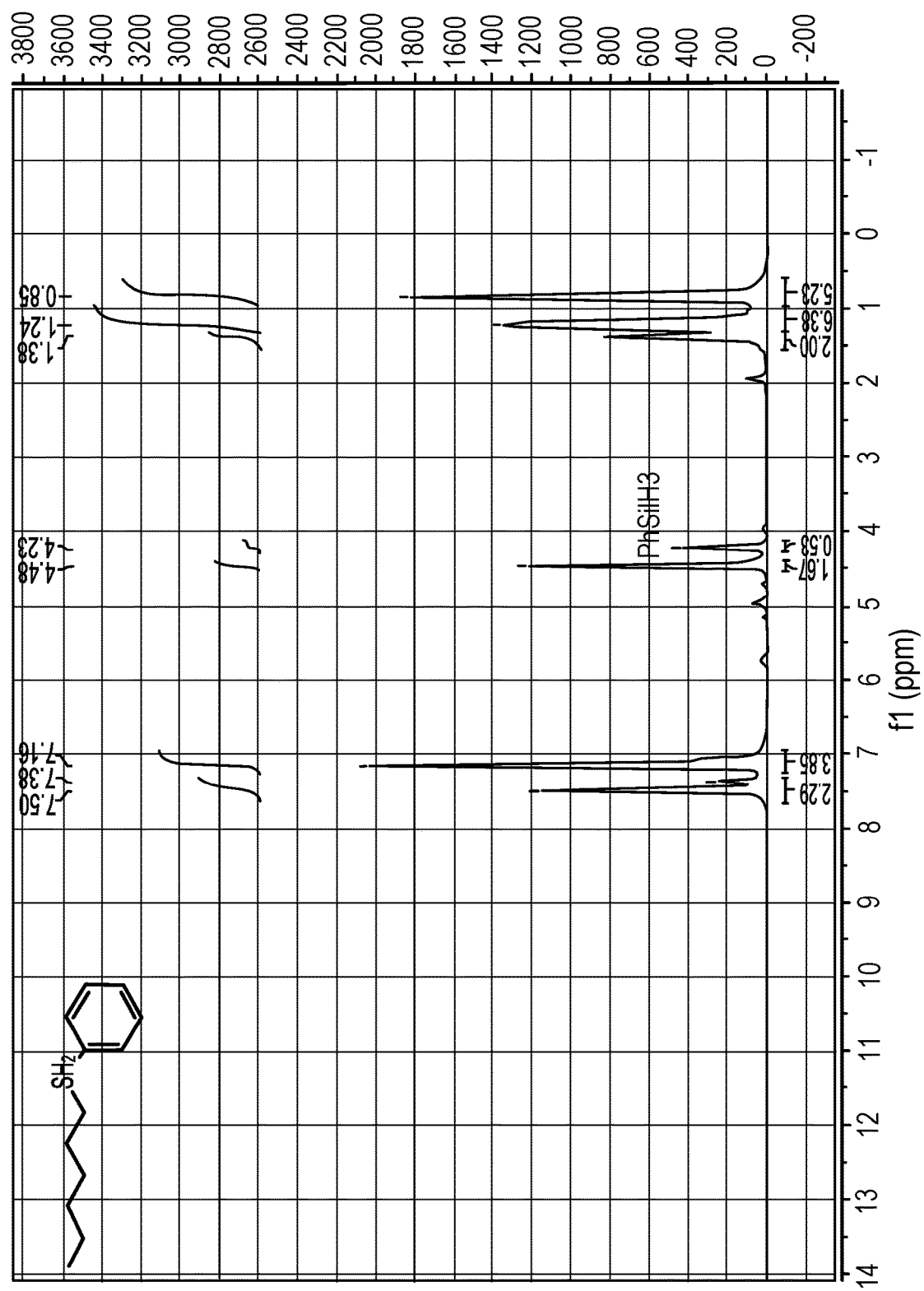
FIG. 6 is a $^1H$ nuclear magnetic resonance (NMR) spectrum of the hydrosilylation product of 1-hexene described in Example 32.

Under inert atmosphere, 1-hexene (131.84 μL, 1.054 mmol) and phenyl silane (130.10 μL, 1.054 mmol) were added to a J. Young tube. Next, a solution of [($^{iPr2Ph}$BDI)Mn(μ-NHCH$_2$Ph)]$_2$ (0.0061 g, 0.0053 mmol) in benzene-d$_6$ was added. The tube was sealed under N$_2$ atmosphere and heated at 130° C. After 38 h, 82% conversion was observed via $^1$H NMR spectroscopy. $^1$H NMR (benzene-d$_6$, 25° C.): δ 7.50-7.38 (m, 2H, phenyl), 7.20-7.12 (m, 3H, phenyl), 4.48 (s, 2H, SiH$_2$Ph), 1.38 (m, 2H, CH$_2$), 1.24 (m, 6H, CH$_2$), 0.85 (m, 5H, CH$_2$—CH$_3$). The spectrum is shown in FIG. 6.

Example 33

Exemplary Demonstration of Olefin Hydroboration

Example 33. Hydroboration of 1-hexene Catalyzed by 1 mol % of ($^{iPr2Ph}$BDI)Mn(BH$_2$)(THF)

Figure 7:
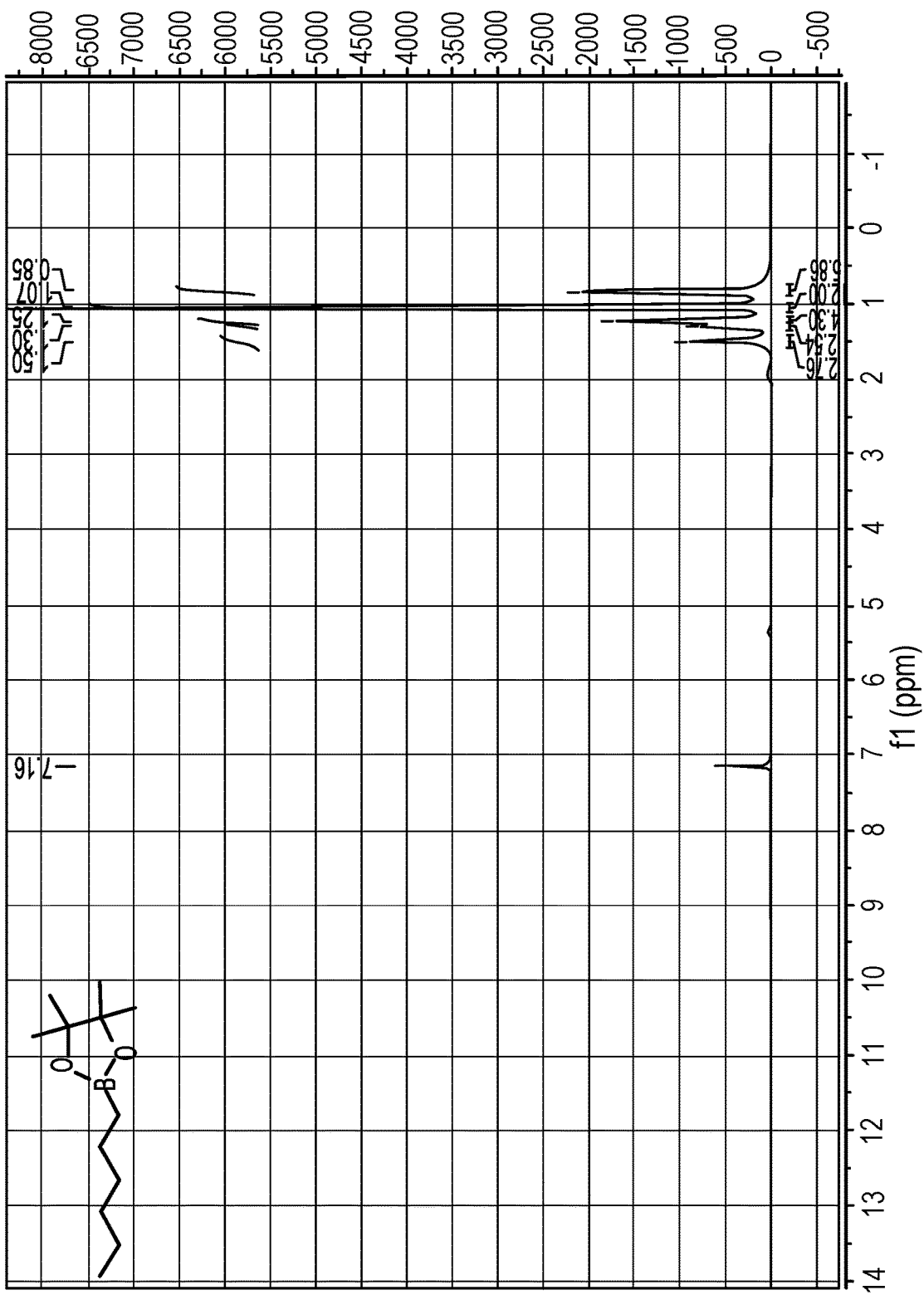
FIG. 7 is a $^1H$ NMR spectrum of the hydroboration product of 1-hexene described in Example 33.

Under inert atmosphere, 1-hexene (139.1 μL, 1.112 mmol) and HBpin (161.4 μL, 1.112 mmol) were added to a J. Young tube. Next, a solution of ($^{iPr2Ph}$BDI)Mn(BH$_2$)(THF) (0.0062 g, 0.011 mmol) in benzene-d$_6$ was added. The tube was sealed under N$_2$ atmosphere and heated at 120° C. After 24 h, >99% conversion was observed via $^1$H NMR spectroscopy. $^1$H NMR (benzene-d, 25° C.): δ 1.50 (m, 2H, CH$_2$), 1.30 (m, 2H, CH$_2$), 1.25 (m, 4H, CH$_2$), 1.07 (s, 12H, CH$_3$), 0.85 (m, 5H, CH$_2$—CH$_3$). The spectrum shown in FIG. 7.

Example 34

Exemplary Demonstration of Nitrile Dihydroboration Using a Manganese Complex Featuring Mn—Mn Bonding Example 34. Hydroboration of Benzonitrile Catalyzed by 5 Mol % of [($^{iPr2Ph}$BDI)Mn(μ-H)]$_2$ (10 Mol % Based on Mn)

Figure 8:
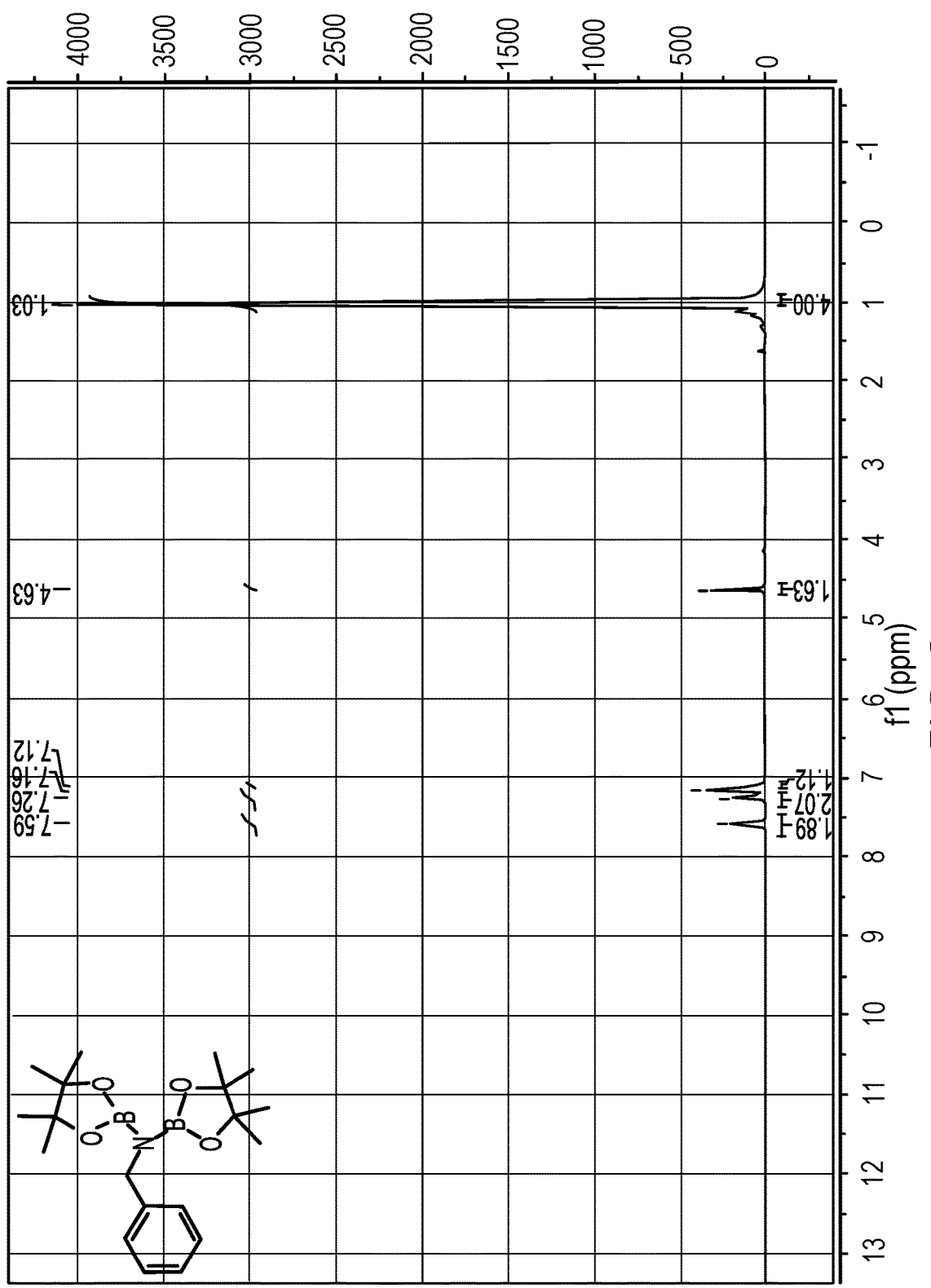
FIG. 8 is a $^1H$ NMR spectrum of the hydroboration product of benzonitrile described in Example 34.

In the glove box, benzonitrile (9.587 μL, 0.093 mmol) and HBpin (29.7 μL, 0.2045 mmol) were added to a J. Young tube. Next, a solution of [($^{iPr2Ph}$BDI)Mn(μ-H)]$_2$ (0.0072 g, 0.00746 mmol) in benzene-d$_6$ was added. The tube was sealed under N$_2$ atmosphere and heated at 80° C. After 48 h, >99% conversion to the respective N,N-diborylamine product was observed via $^1$H NMR spectroscopy. Partial conversion has also been noted at ambient temperature. $^1$H NMR (benzene-d, 25° C., 400 MHz): δ 7.59 (m, 2H, Ar—H), 7.26 (m, 2H, Ar—H), 7.12 (s, 1H, Ar—H), 4.63 (s, 2H, —CH$_2$), 1.03 (s, 24H, —CH$_3$). The spectrum is shown in FIG. 8.

Examples 35-36

Exemplary Demonstration of Dehydrogenative Amine Silylation Using a Manganese Complex Featuring Mn—Mn Bonding

Example 35. Dehydrogenative Silylation of Ammonia with Silane Catalyzed by [($^{iPr2Ph}$BDI)Mn(μ-H)]$_2$ In the glove box, a 1 L Schlenk flask was charged with a stir bar and a solution of [($^{iPr2Ph}$BDI)Mn(μ-H)]$_2$ in benzene-d$_6$. The flask was then removed from the glovebox and the solution was frozen in liquid nitrogen. On a high vacuum line, the flask was evacuated and approximately 100 torr of SiH$_4$ was condensed from a 2% mixture in argon. At that point, the argon was evacuated and approximately 100 torr of NH$_3$ was added. The flask was then sealed, warmed to ambient temperature, and allowed to stir for 48 h. The flask was then evacuated and transferred to the glovebox, where the resultant yellow solid was washed to remove any residual catalyst. The product was identified to be a yellow polysilazane polymer.

Example 36. Catalytic Polymerization of tris(2-aminoethyl)amine and Polymethylhydrosiloxane Using 0.5 Mol % [($^{iPr2Ph}$BDI)Mn(μ-H)]$_2$ (1 Mol % Based on Mn)

Under inert atmosphere, a scintillation vial was charged with [($^{iPr2Ph}$BDI)Mn(μ-H)]$_2$ (0.00105 g, 0.0109 mmol). Then, polymethylhydrosiloxane (0.41 mL, 0.1720 mmol, 6.5316 mmol of Si—H) was added to the vial. Tris(2-aminoethyl)amine (0.33 mL, 2.177 mmol) was then added and H$_2$ gas was formed instantly along with a clear solid. The neat mixture was allowed to sit at room temperature for 12 h. After that, the resulting gummy solid was then washed twice with toluene (2 mL) and once with pentane (1 mL) and dried under vacuum to obtain a white solid (0.531 g) identified as a hybrid polysilazane-polysiloxane polymer.

Examples 37-38

Exemplary Demonstration of Dehydrogenative Amine Borylation Using a Manganese Complex Featuring Mn—Mn Bonding

Example 37. Dehydrogenative Borylation of Benzylamine Using Pinacolborane and 5 Mol % [($^{iPr2Ph}$BDI)Mn(μ-H)]$_2$ (10 Mol % Based on Mn)

Figure 9:
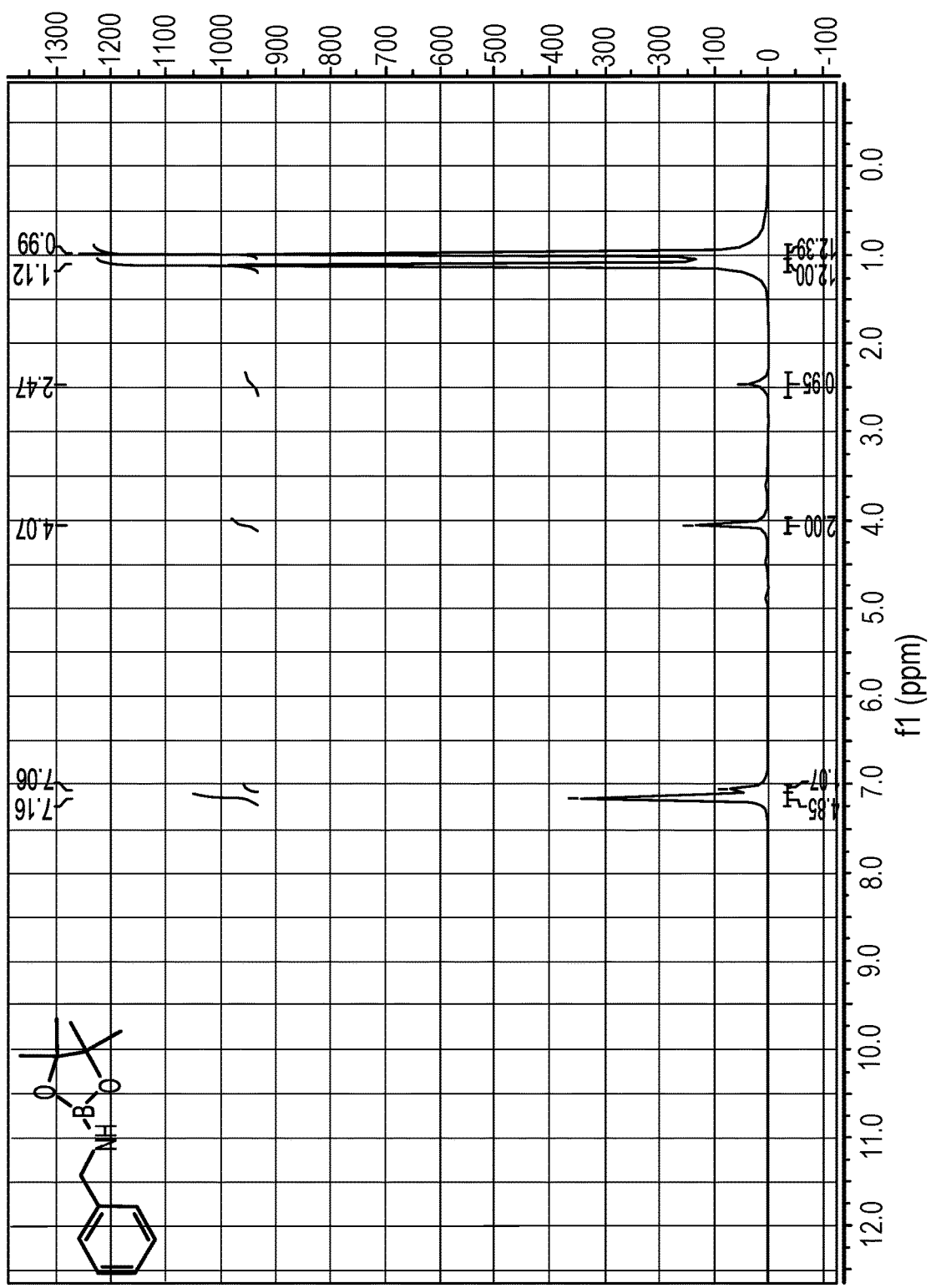
FIG. 9 is a $^1H$ NMR spectrum of the dehydrogenative borylation (monoborylamine) product of benzylamine described in Example 37.

In the glove box, benzylamine (16.3 μL, 0.149 mmol) and HBpin (47.7 μL, 0.328 mmol) were added to a J. Young tube. A white precipitate was instantly formed. Then, a solution of [($^{iPr2Ph}$BDI)Mn(μ-H)]$_2$ (0.0072 g, 0.00746 mmol) in benzene-d$_6$ was added, the white slurry turned into yellow clear solution with the liberation of H$_2$ gas. The tube was sealed under N$_2$ atmosphere and allowed to sit at room temperature. After 4 hours, >99% conversion was observed via $^1$H NMR spectroscopy. NMR spectroscopy revealed two sets of signals for HBpin as well as the signal of B—H, which indicated that the monoborylamine product had formed. $^1$H NMR (benzene-d$_6$, 25° C., 400 MHz): δ 7.09-7.00 (m, 5H, Ar—H), 4.07 (s, 2H, —CH$_2$), 2.47 (s, 1H, —NH), 1.12 (s, 12H, —CH$_3$), 0.99 (s, 12H, —CH$_3$). This spectrum is shown in FIG. 9.

Figure 10:
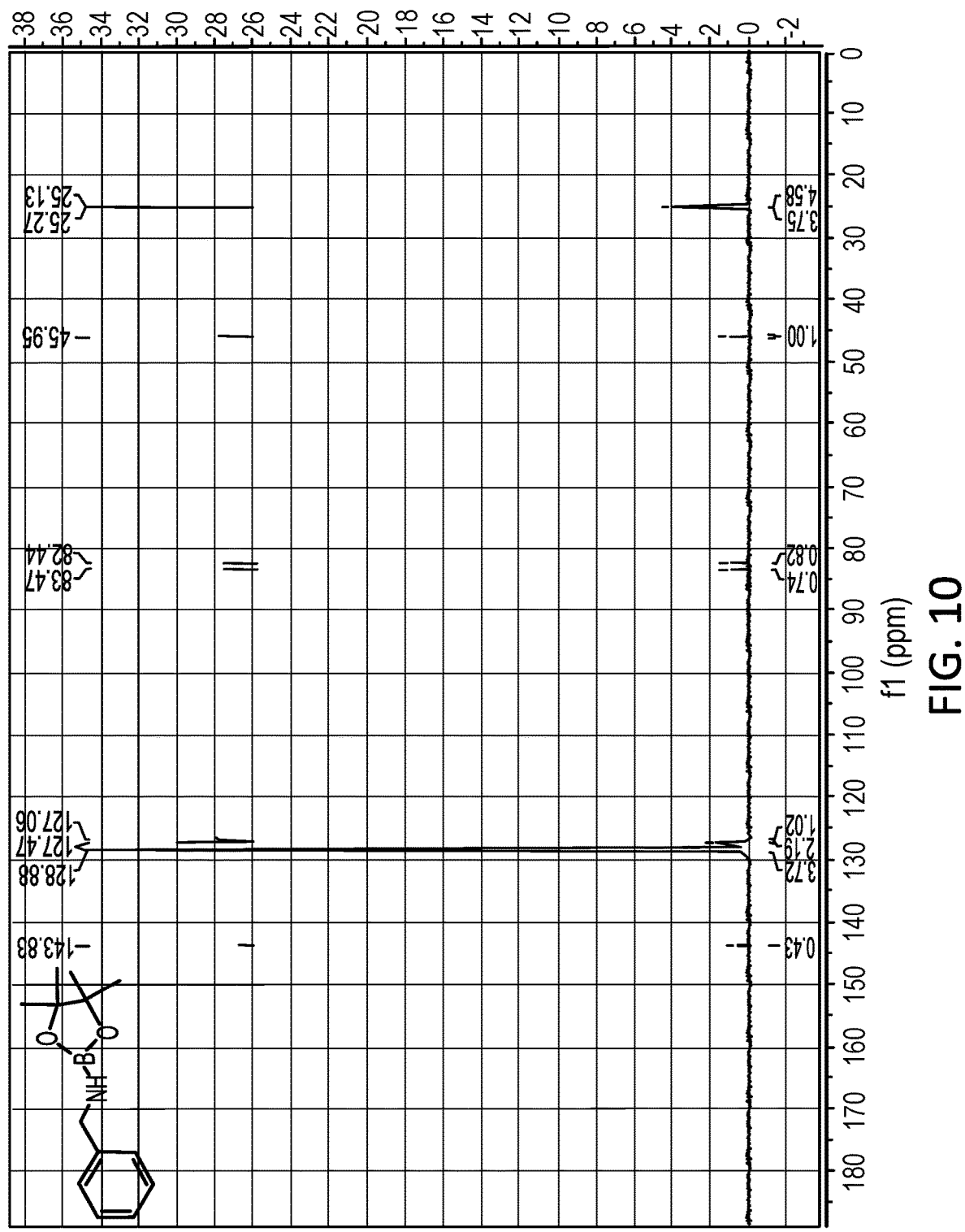
FIG. 10 is a $^{13}C$ NMR spectrum of the dehydrogenative borylation (monoborylamine) product of benzylamine described in Example 37.

The product was also characterized by $^{13}$C NMR spectroscopy. $^{13}$C NMR (benzene-d$_6$, 25° C., 400 MHz): δ 143.83 (CH), 128.88 (CH), 127.47 (CH), 127.06 (CH), 83.47 (CCH$_3$), 82.44 (CCH$_3$), 45.95 (CH$_2$), 25.27 (CH$_3$), 25.13 (CH$_3$). This spectrum is shown in FIG. 10.

Figure 11:
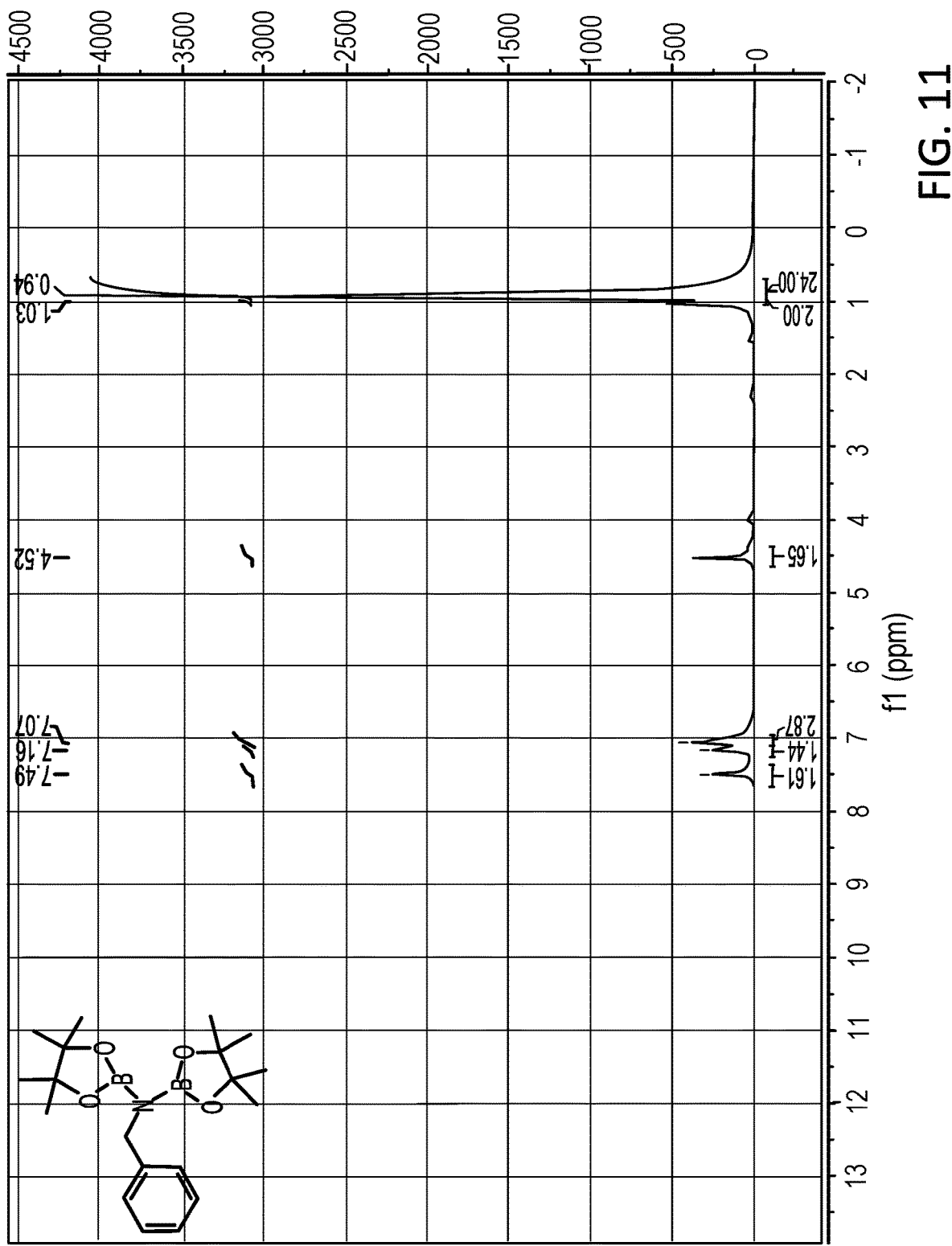
FIG. 11 is a $^1H$ NMR spectrum of the dehydrogenative borylation (diborylamine) product of benzylamine described in Example 37.

This J. Young tube was then heated at 60° C. for 48 h, after which time >99% conversion of the to the N,N-diborylamine product was observed. $^1$H NMR (benzene-d$_6$, 25° C., 400 MHz) δ 7.49 (m, 2H, Ar—H), 7.07 (m, 3H, Ar—H), 4.52 (s, 2H, —CH$_2$), 1.03 (s, —CH$_3$, excess HBpin), 0.94 (s, 24H, —CH$_3$). This spectrum is shown in FIG. 11.

Example 38. Dehydrogenative Borylation of tris(2-aminoethyl)amine Using BH$_3$.THF and 0.5 Mol % [($^{iPr2Ph}$BDI)Mn(μ-H)]$_2$ (1 Mol % Based on Mn)

Under inert atmosphere, a scintillation vial was charged with [($^{iPr2Ph}$BDI)Mn(μ-H)]$_2$ (0.00118 g, 0.977 mmol). The vial was then kept cold using a cold well and BH$_3$-THF (2.45 mL of 1M solution in THF, 2.447 mmol) was added to the vial under cold conditions to form a clear solution. Next, tris(2-aminoethyl)amine (0.37 mL, 2.447 mmol) was added to the mixture and the vial was sealed under N$_2$ atmosphere. A white cloudy solid was formed instantly. The neat mixture was allowed to sit at room temperature. After 24 h, the white solid was collected via filtration and washed with toluene and pentane to yield 0.0121 g of aminoborane polymer.

Only a few implementations are described and illustrated. Variations, enhancements and improvements of the described implementations and other implementations can be made based on what is described and illustrated in this document.

What is claimed is:
1. A method of facilitating a dehydrogenative amine silylation reaction, the method comprising reacting a first compound having one or more Si—H bonds with a second compound having one or more N—H bonds in the presence of one or more of the manganese complexes represented by General Formula G-1:

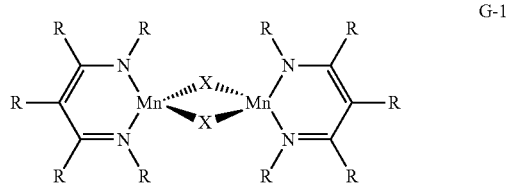

wherein:
each X independently represents a hydride, an alkyl, an alkoxide, an amide, a silyl, or a boryl, and
each R independently represents hydrogen; a substituted, unsubstituted, or cyclic C$_1$-C$_{24}$ alkyl group that optionally comprises one or more heteroatoms; an aryl or substituted aryl group that optionally comprises one or more heteroatoms; a ring formed from two R groups taken together that is a substituted or unsubstituted, saturated or unsaturated cyclic structure that optionally comprises one or more heteroatoms; a halide; an alkoxide; an amide; a silyl; a boryl; or any combination or salt thereof.

2. The method of claim 1, wherein H$_2$ is formed from hydrogen in at least one of the one or more Si—H bonds of the first compound and hydrogen in at least one of the one or more the N—H bonds of the second compound to yield a product having one or more Si—N bonds.

3. The method of claim 1, wherein the first compound comprises $SiH_4$ and the second compound comprises $NH_3$, and $H_2$ is formed from one or more hydrogens in the $SiH_4$ and one or more hydrogens in the $NH_3$ to yield a polysilazane polymer having one or more Si—N bonds.

4. The method of claim 3, wherein the polysilazane polymer has one or more Si—H bonds, one or more N—H bonds, or both.

5. The method of claim 1, wherein the first compound comprises a siloxane polymer and the second compound comprises a monomer or a polymer having one or more amine groups, and $H_2$ is formed from the first compound and the second compound to yield a polysilazane polymer having one or more Si—N bonds.

6. The method of claim 5, wherein the polysilazane polymer comprises one or more Si—H bonds, one or more N—H bonds, or both.

* * * * *